(12) United States Patent  
Isomura

(10) Patent No.: US 8,270,747 B2  
(45) Date of Patent: Sep. 18, 2012

(54) IMAGE ENCODING DEVICE, IMAGE DECODING DEVICE, AND INTEGRATED CIRCUIT

(75) Inventor: Masakazu Isomura, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 848 days.

(21) Appl. No.: 12/410,081

(22) Filed: Mar. 24, 2009

(65) Prior Publication Data

US 2009/0245631 A1 Oct. 1, 2009

(30) Foreign Application Priority Data

Mar. 28, 2008 (JP) ................. 2008-085323

(51) Int. Cl.
*G06K 9/00* (2006.01)
(52) U.S. Cl. ...................... 382/253; 382/251
(58) Field of Classification Search .................. 382/232, 382/251, 253
See application file for complete search history.

(56) References Cited

U.S. PATENT DOCUMENTS

| | | | |
|---|---|---|---|
| 4,903,317 A | 2/1990 | Nishihara et al. | |
| 5,544,251 A * | 8/1996 | Coelho | 382/232 |
| 6,625,214 B1 * | 9/2003 | Umehara et al. | 375/240.12 |

FOREIGN PATENT DOCUMENTS

| | | |
|---|---|---|
| JP | A-60-177787 | 9/1985 |
| JP | A-63-125078 | 5/1988 |
| JP | A-2-070125 | 3/1990 |
| JP | A-7-95412 | 4/1995 |
| JP | A-7-95420 | 4/1995 |
| JP | A-7-107492 | 4/1995 |
| JP | A-8-242446 | 9/1996 |
| JP | A-9-83809 | 3/1997 |
| JP | A-11-8851 | 1/1999 |
| JP | A-2000-92332 | 3/2000 |
| JP | A-2001-257888 | 9/2001 |
| JP | A-2004-104624 | 4/2004 |
| JP | A-2007-178850 | 7/2007 |
| JP | A-2007-178851 | 7/2007 |
| JP | A-2007-181051 | 7/2007 |
| JP | A-2007-184977 | 7/2007 |
| JP | A-20017-181052 | 7/2007 |

* cited by examiner

*Primary Examiner* — Brian Le
(74) *Attorney, Agent, or Firm* — Oliff & Berridge, PLC

(57) ABSTRACT

An image encoding device that receives a plurality of component values of a color input signal inputted to an object pixel, vector quantizes, and encodes each of the plurality of component values includes: a difference vector quantization unit that vector quantizes and encodes each difference value obtained by subtracting prediction component values based on a previous object pixel from the component values of the object pixel respectively; an absolute value vector quantization unit that vector quantizes and encodes each different value of the object pixel; a determination unit that compares each difference value with respective comparison ranges to determine a code selection; and a code selector that selects one of an output from the difference vector quantization unit and an output from the absolute value vector quantization unit based on an output from the determination unit.

14 Claims, 16 Drawing Sheets

IMAGE ENCODING DEVICE, IMAGE DECODING DEVICE, AND INTEGRATED CIRCUIT

The entire disclosure of Japanese Patent Application No. 2008-85323, filed Mar. 28, 2008 is expressly incorporated by reference herein.

BACKGROUND

1. Technical Field

An aspect of the present invention relates to an image encoding device, an image decoding device, and an integrated circuit device.

2. Related Art

JP-A-2000-92332 is a first example, JP-A-9-83809 is a second example, JP-A-2004-104624 is a third example, and JP-A-2001-257888 is a fourth example of related art that disclose the image encoding device and the image decoding device. The image encoding device disclosed in the first to the third examples, since an image inputted in raster order is encoded in units of a small block, a blocking method is required. Similarly, the image decoding device disclosed in the first to the third examples requires a deblocking method for returning the image encoded in units of a black in raster order.

In the blocking method and the deblocking method, for example, a block line memory shown in FIG. 10 of the second example of related art is required, thereby cost is increased.

In the first example, an image is divided into small blocks, and Hadamard transform and a discrete cosine transform (DCT) are performed so that a conversion coefficient is non-linear quantized. Accordingly, if the block includes an edge where gray scale varies greatly, a quantized error caused by a high frequency component of the edge part is dispersed to all pixels in the block. As a result, deterioration of image quality becomes conspicuous especially in graphic-type (e.g., an image including characters, a map image, and the like).

In the fourth example, since a difference between a local decoding pixel value of a previous pixel and an object pixel is nonlinear quantized per element component, the nonlinear quantization is adversely affected of a quantized error of the previous pixel that is locally decoded. As a brief example, an original image shown in FIG. 17A is encoded so as to obtain a decoded image shown in FIG. 17B will be described. In the original image shown in FIG. 17A, a uniform longitudinal stripe pattern LSP and the left side of the longitudinal stripe pattern LSP have a different pixel value of a line n from other lines. In this case, when a pixel (n, m), positioned in the line n and the longitudinal stripe pattern, is encoded, a value of a locally decoded previous pixel (n, m−1) is different from values of other lines, lines n−1 and n+1. Therefore, a decoded image of the pixels (n, m), (n, m+1), and the like, positioned in the line n shown in FIG. 17B, has a quantization noise that is different from a quantization noise of other lines, the lines n−1, n+1, and the like. As a result, deterioration of image quality becomes conspicuous when the deterioration of image quality is compared with that of a decoded image of other lines, the lines n−1, n+1.

SUMMARY

According to some aspects of the invention, an image is encoded and decoded without dividing the image into in units of a small block. Further, an edge part of an image where gray scale varies greatly is encoded without depending on a previous pixel, and the encoded image is decoded so as to provide an image encoding device, an image decoding device, an integrated circuit, and the like that reduce deterioration of image quality.

According to a first aspect of the invention, an image encoding device that receives a plurality of component values of a color input signal inputted to an object pixel, vector quantizes, and encodes each of the plurality of component values includes: a difference vector quantization unit that vector quantizes and encodes each difference value obtained by subtracting prediction component values based on a previous object pixel from the component values of the object pixel respectively; an absolute value vector quantization unit that vector quantizes and encodes each different value of the object pixel; a determination unit that compares each difference value with respective comparison ranges to determine a code selection; and a code selector that selects one of an output from the difference vector quantization unit and an output from the absolute value vector quantization unit based on an output from the determination unit.

According to the first aspect of the invention, when each component value (YCrCb, YUV, RGB, and the like) of the color input signal is encoded, a difference vector quantization and an absolute value vector quantization are selectively used. Based on each difference value obtained in a process of the difference vector quantization, the vector quantization to be used is determined. The difference vector quantization is selected if each difference value between the previous pixel value (a prediction value) and the object pixel value is within the respective comparison ranges, and the absolute value vector quantization is selected if any one of each difference value is outside the comparison range. Accordingly, an edge part of an image where gray scale varies greatly can be encoded (absolute value vector quantized) which does not depend on the previous pixel. If the gray scale does not vary greatly, an image can be encoded (different value vector quantized) which depends on the previous pixel value. Further, in the aspect of the invention, since an image is not necessary to be encoded in units of a small black, a blocking method becomes unnecessary. Accordingly, miniaturization of the image encoding device can be achieved.

In the first aspect of the invention, each component value of the color input signal may be a luminance component and two kinds of color difference components. Since an absolute vector quantization space of the signals (YCrCb, YUV, and the like) of the luminance component and two kinds of color difference components are smaller than an absolute value vector quantization space of an RGB signal, quantization representative values can be efficiently assigned.

For example, the determination unit may include a plurality of comparators that compares each difference value with the respective comparison ranges and an encode selection signal generating unit. Based on an output from the plurality of comparators, the encode selection signal generating unit selects an output from the difference vector quantization unit if each difference value is within the respective comparison ranges, and selects an output from the absolute vector quantization unit when each difference value is outside the respective comparison ranges.

Accordingly, the difference vector quantization can be selected when the difference values (when the value is a negative number, its absolute value) between the previous pixel value (a prediction value) and the object pixel value is smaller than the respective comparison ranges, and the absolute value vector quantization can be selected when any one of each difference value is larger than the respective comparison ranges. In addition, a first to a third comparators and the encode selection signal generating unit may include a read only memory (ROM) and logic synthesis unit, a table, and the like.

In the first aspect of the invention, the difference vector quantization unit may include a difference vector quantizer that only vector quantizes each difference value existing within the respective comparison ranges. Since the difference vector quantizer only vector quantizes the difference values existing within the respective comparison ranges, the number of codes assigned to the difference vector quantization can be reduced. As a result, compaction efficiency is improved.

In the first aspect of the invention, the difference vector quantizer may equivalently include a virtual difference vector quantization space that includes respective axes one of which each difference value existing within the respective comparison ranges to be plotted, and a plurality of difference vector quantization representative values is assigned to the difference vector quantization space. Accordingly, the difference values that only exist within the respective comparison ranges can be vector quantized.

In the first aspect of the invention, the plurality of the difference vector quantization representative values may be closely arranged as each difference value approaches to an origin where each difference value is zero, the plurality of the difference vector quantization representative values may be roughly arranged as each difference value moves away from the origin in the difference vector quantization space.

Accordingly, a pixel having a small color variation of the image with respect to the pixel of a previous stage is closely quantized. Therefore, an area between pixels where varies less can be encoded faithfully to an original image. On the other hand, a pixel having a large color variation with respect to the pixel of a previous stage is roughly quantized. Accordingly, in regard to an edge part of an image where gray scale varies greatly, encoding without depending on the previous pixel can be guaranteed.

In the first aspect of the invention, the plurality of difference vector quantization representative values may not arranged to eight corners of a rectangular parallelepiped space that is surrounded by an upper threshold and a lower threshold of each of the comparison ranges in the difference vector quantization space, and the code selector may select an output of the absolute value vector quantization unit based on an output from the determination unit if a difference vector quantization representative value corresponding to each difference value does not exist.

Accordingly, even if each difference value exists within the respective comparison ranges, not the difference vector quantization but the absolute value vector quantization can be selected when at least one of the difference values is outstandingly large.

In the first aspect of the invention, each difference value may be represented by bits, and only lower-order bits that included in the bits and within the respective comparison ranges may be inputted to the difference vector quantizer. That is because when each difference value exists within the respective comparison range, the higher-order bits are ignored.

In the first aspect of the invention, the absolute value vector quantization unit may equivalently include a virtual absolute value vector quantization space that includes respective axes one of which each component value to be plotted, and a plurality of absolute value vector quantization representative values may be assigned to the absolute value vector quantization space of a sphere.

Especially, since a YCbCr space and a YUV space are narrower than an RGB space, the absolute value vector quantization representative values of a finite number can be closely arranged. The YCbCr space and the YUV space are narrower than the RGB space since they include a color difference signal. Accordingly, the absolute value vector quantization in the YCbCr space and the YUV space make efficient encoding possible without having wasted codes compared to the absolute value vector quantization in the RGB space.

In the first aspect of the invention, only higher-order bits of each component value may be inputted to the absolute value vector quantization unit. The components are quantized into the higher-order bits since quantizing finely using lower-order bits is less required in the absolute value vector quantization. It is because the absolute value vector quantization is selected when at least one of the difference values exceeds the comparison range.

In this case, the absolute value vector quantization unit may include a plurality of pre-scalar quantizers that scalar quantize each component value and an absolute value vector quantizer that outputs one of the plurality of the absolute value vector quantization representative values based on an output from the plurality of the pre-scalar quantizers.

According to a second aspect of the invention, an image decoding device that receives an encoding signal that a plurality of component values of a color input signal inputted to a pixel is vector quantized, inverse vector quantizes, and decodes the encoding signal includes: a determination unit to which the encoding signal is inputted and determines whether the encoding signal is a difference vector quantized code or an absolute value vector quantized code; a difference vector inverse quantization unit that receives the encoding signal, and inverse vector quantizes and decodes a difference vector quantized code in a case where the encoding signal received is the difference vector quantized code; an absolute value vector inverse quantization unit that receives the encoding signal, and inverse vector quantizes and decodes an absolute value vector quantized code in a case where the encoding signal received is the absolute value vector quantized code; and a decoding selector that selects one of an output from the difference vector inverse quantization unit and an output from the absolute value vector inverse quantization unit based on an output from the determination unit.

According to the second aspect of the invention, when a code that is outputted by selectively using the difference vector quantization and the absolute value vector quantization is inputted to the image decoding device as described in the first aspect, the input color can be decoded by selectively using the difference vector quantization and the absolute value vector quantization based on the code inputted thereto.

In the second aspect of the invention, as described above, each component value of the color input signal may be a luminance component and two kinds of color difference components.

In the second aspect of the invention, the encoding signal may be one of N number of codes, M (M<N) number of codes out of the N number of codes may be difference vector quantized codes, and (N−M) number of codes out of the N number of codes may be absolute value vector quantized codes. In the device, the determination unit determines whether a code of the encoding signal belongs to the M or the (N−M). That is, the determination unit can determine the code to be difference vector inverse quantized or absolute value vector inverse quantized by the code.

According to a third and a fourth aspect of the present invention defines an integrated circuit that includes the image encoding device or the image decoding device described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described in detail below. The embodiments explained below do not unduly limit the contents of the present invention described in the claims and all of the configurations explained in the embodiments are not indispensable to the means to solve the problem of the invention.

Image Encoding Device

Figure 1:
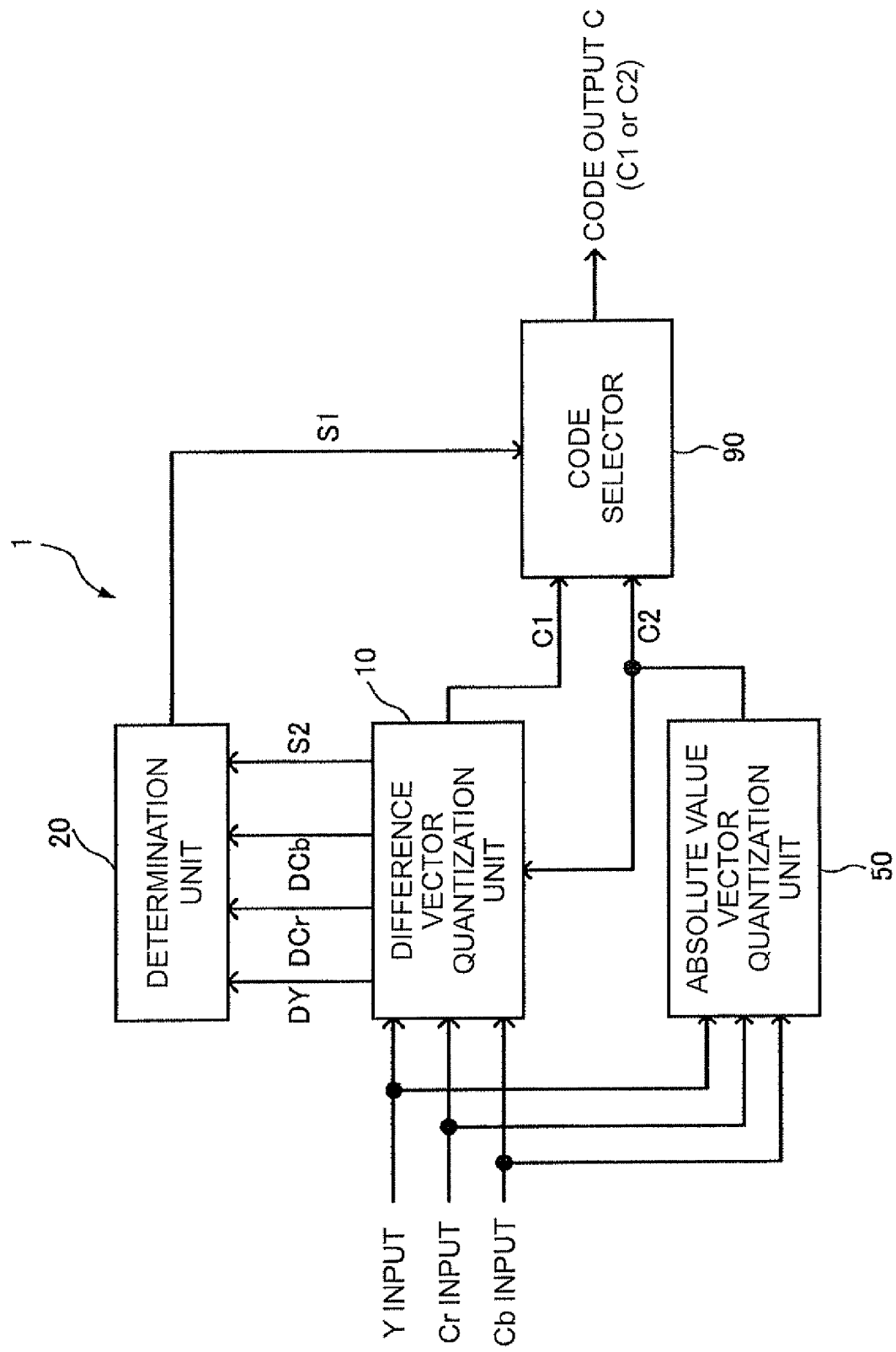
FIG. 1 is a block diagram schematically showing an image encoding device according to an embodiment of the invention.

FIG. 1 is a block diagram schematically showing an image encoding device 1 according to one embodiment of the invention. In FIG. 1, to the image encoding device 1, a plurality of component values (e.g., Y, Cr, and Cb) of an input color signal is inputted to a pixel. Then, the image encoding device 1 respectively vector quantizes and encodes the component values Y, Cr, and Cb. The image encoding device 1 roughly includes a difference vector quantization unit 10, a determination unit 20, an absolute value vector quantization unit 50, and a code selector 90.

The difference vector quantization unit 10 vector quantizes and encodes component difference values DY, DCr, and DCb. The component difference values DY, DCr, and DCb are obtained by subtracting prediction component values based on a previous object pixel value from the component values Y, Cr, and Cb of the object pixel respectively. The absolute value vector quantization unit 50 vector quantizes and encodes the component values of the object pixel. The determination unit 20 compares the difference values DY, DCr, and DCb with respective comparison ranges so as to determine a code selection. The code selector 90, based on an output from the determination unit 20, selects one of an output C1 outputted from the difference vector quantization unit 10 and an output C2 outputted from the absolute value vector quantization unit 50 so as to output an encoding signal C (C1 or C2). More specifically, the code selector 90 selects the output C1 of the difference vector quantization unit 10 when the difference values DY, DCr, and DCb are within the respective comparison ranges. When the difference values DY, DCr, and DCb are outside the respective comparison ranges, the code selector 90 selects the output C2 of the absolute value vector quantization unit 50.

Here, in the embodiment, a vector quantization is used. Whereas each component is independently quantized in a scalar quantization, a plurality of components is quantized at a time in the vector quantization. In addition, two kinds of vector quantizations are selectively used. The difference vector quantization unit 10 vector quantizes each difference signal component obtained by subtracting prediction signal components based on a previous object pixel from the signal components of the object pixel respectively (a difference vector quantization mode). On the other hand, the absolute value vector quantization unit 50 independently vector quantizes an absolute value of the signal component of the object pixel from the prediction signal component based on the previous object pixel (an absolute value vector quantization mode).

Quantization in Difference Vector Quantization Mode

Figure 2:
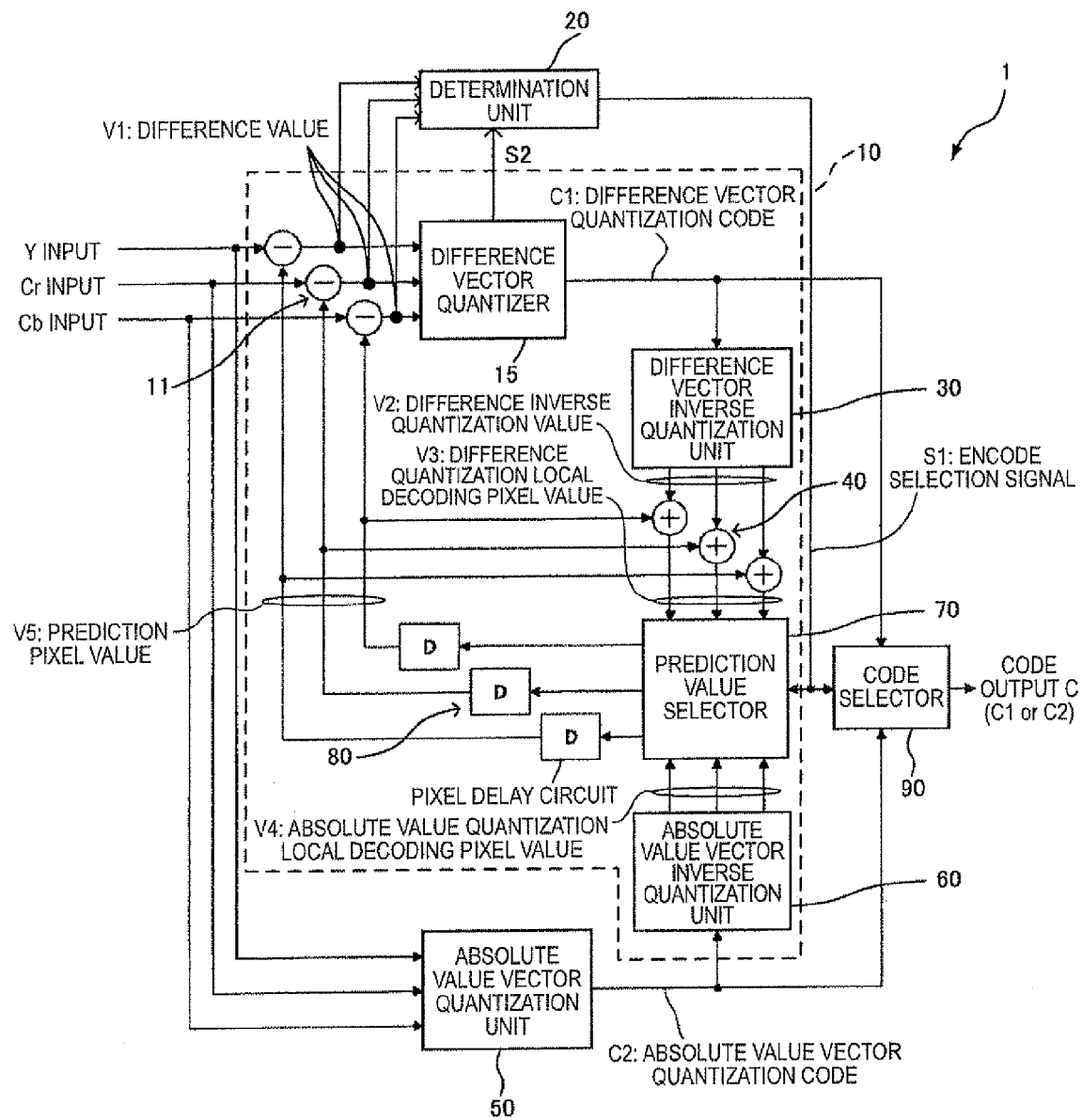
FIG. 2 is a block diagram schematically showing a detail of a difference vector quantization unit of the image encoding device shown in FIG. 1.

FIG. 2 shows a detail of the difference vector quantization unit 10 of the image encoding device 1 shown in FIG. 1. The difference vector quantization unit 10 includes a difference device 11, a difference vector quantizer 15, a difference vector inverse quantizer 30, an adder 40, an absolute value vector inverse quantizer 60, a prediction value selector 70, and a pixel delay circuit 80.

To the difference device 11, each component of a color pixel which is an input to the image encoding device 1 is respectively inputted. In the embodiment, a luminance signal Y and color difference signals Cr and Cb are used as the component of an input color pixel, for example. However, other signals such as the luminance signal Y, YUV signals composed of two kinds of color difference signals UV, and the like may be used. The component of a color image may be RGB. However, as a comparison of FIGS. 5 and 6 to be described later, an RGB space shown in FIG. 6 has a disadvantage for having a larger space than a YCrCb space shown in FIG. 5.

To the difference device 11 shown in FIG. 2, Y, Cr, and Cb components to be encoded and Y, Cr, Cb components of the prediction value based on the previous object pixel are inputted so as to obtain a difference value V1 for each component.

The image encoding device 1 becomes the difference vector quantization mode when the difference value V1 of each component is within the respective comparison ranges, and becomes the absolute value vector quantization mode when the difference value V1 of each component is outside the respective comparison ranges. When a total number of codes quantized in any one of the modes is N, for example, 0 to M−1 number of codes are assigned to the difference vector quantization mode as M (M<N) number of codes, and M to N−1 number of codes are assigned to the absolute value vector quantization mode as (N−M) number of codes.

Specifically, in the vector quantization in these two modes, when each component of the color signals Y, Cb, and Cr are respectively 8 bits, 24 bits which is a total of the components are compressed to 10 bits (0 to 1023 N=1024), for example. When the number of quantization representative values (codes) assigned to the difference vector quantization mode M is 300 (M=300), 0 to 299, for example, the number of quantization representative values assigned to the absolute value vector quantization mode (N−M) is 724, 300 to 1023.

When the number of the quantization representative values assigned to the difference vector quantization mode becomes larger, an area of an image where the image changes gradually is reproduced faithfully. However, the number of the quantization representative values assigned to the absolute value vector quantization mode becomes smaller, an area of an image where the image changes abruptly is reproduced roughly. On the other hand, when the number of the quantization representative values assigned to the absolute value vector quantization mode (N−M) becomes too large, an area of an image where the image changes gradually cannot be reproduced faithfully. As a result, deterioration of image quality occurs. Therefore, the number of the vector quantization representative values M with respect to the total number of codes N is required be set by taking both balance of M and N into consideration, and specifically, is evaluated and determined while watching the image.

The difference vector quantizer 15 selects a quantization representative value which is the spatially closest (a quantized error becomes the minimum) to a coordinate determined by each difference value of the inputted component out of M number of quantization representative values provided in a virtual three-dimensional space (a difference vector quantization space) where the difference values of the component are axes. Then, the difference vector quantizer 15 outputs a unique code assigned to the representative value as a difference vector quantization code C1. In addition, to the quantization representative values of the difference vector quantization, M number of codes of 0 to M−1 is assigned.

Figure 3:
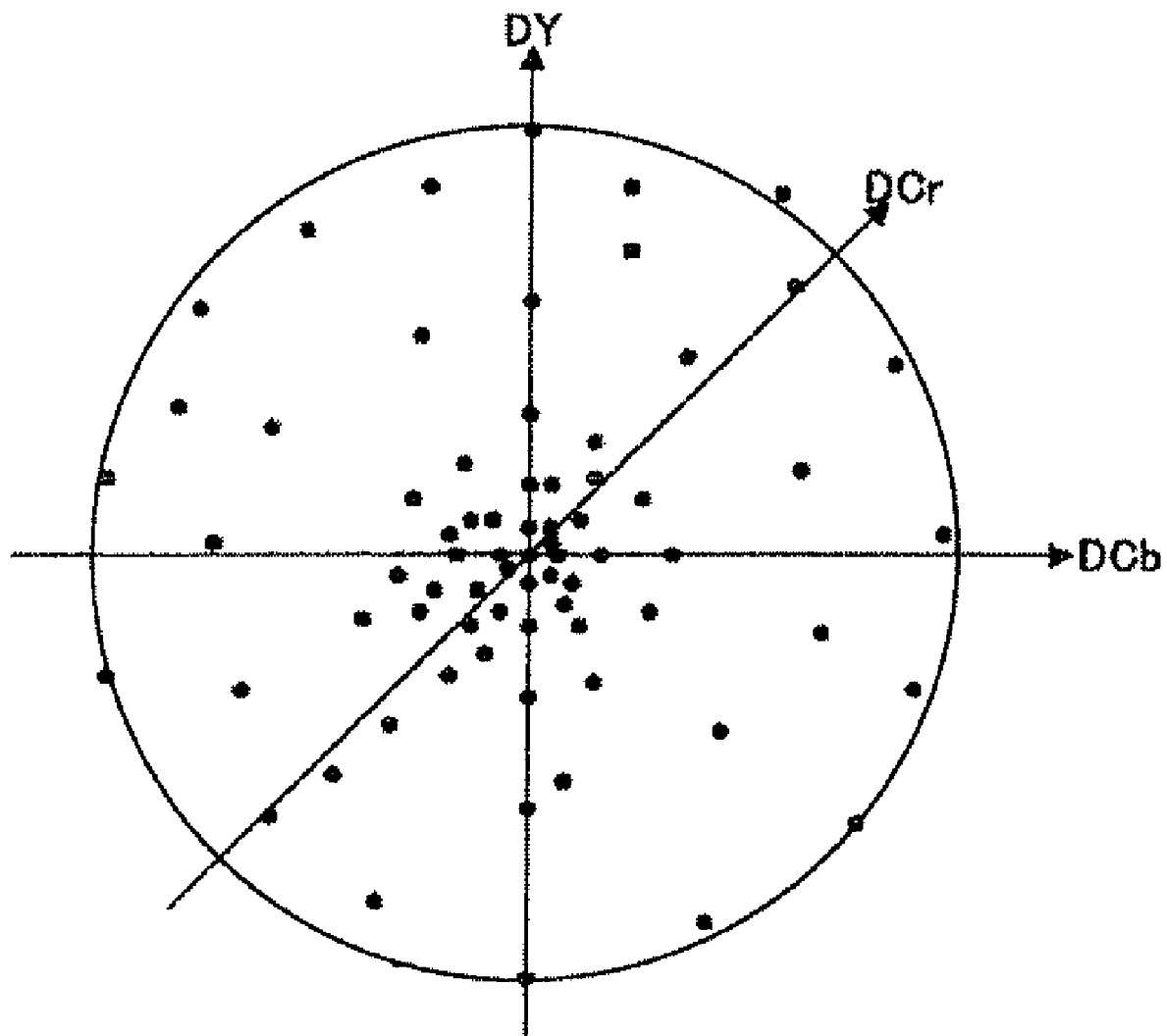
FIG. 3 is a diagram schematically showing a distribution of M number of quantization representative values arranged in a virtual difference vector quantization space.

FIG. 3 is a diagram schematically showing a distribution of the quantization representative values in a virtual difference vector quantization space. As shown in FIG. 3, the difference vector quantization representative values indicated in black dots are closely arranged in a space where each difference value of the component is close to zero, and roughly arranged as each difference value of the component moves away from the origin. Accordingly, a pixel having a small difference voltage V1, that is, a pixel having a small color variation of an image with respect to a pixel of the previous stage is closely quantized. On the other hand, a pixel having a large difference voltage VI, that is, a pixel having a large color variation of an image with respect to a pixel of the previous stage is roughly quantized. The quantization representative values in the difference vector quantization are tabulated, for example, and a value that selects a representative value which is the spatially closest to the difference value V1 becomes the difference vector quantization code C1.

Here, the difference vector quantizer 15 outputs a signal indicating the difference vector quantization is invalid when a spatial position of the difference value V1 of each component is a constant distance away from the origin. The obtained signal serves as a code selection signal S1. Further, when the code selection signal S1 indicates invalidity of the difference vector quantization, the quantization is performed in the absolute value vector quantization unit 50.

In addition, not absolute values of each component Y, Cr, and Cb in the general scalar quantization but the difference values DY, DCr, and DCb are plotted to the respective axes of the three-dimensional space shown in FIG. 3. As described above, since the difference vector quantization is invalid when the difference value is large, the respective axes of the three-dimensional space shown in FIG. 3 are shorter than a case of the scalar quantization and the three-dimensional space is smaller. Therefore, the number of M which is the representative values that should be assigned can be reduced. Therefore, the number of M is increased by closely arranging the representative values in the small three-dimensional space shown in FIG. 3, or the number of (N−M) is increased by closely arranging the representative values of the absolute value vector quantization so that N number of codes can be assigned efficiently so as to improve accuracy of the compression.

Figure 4:
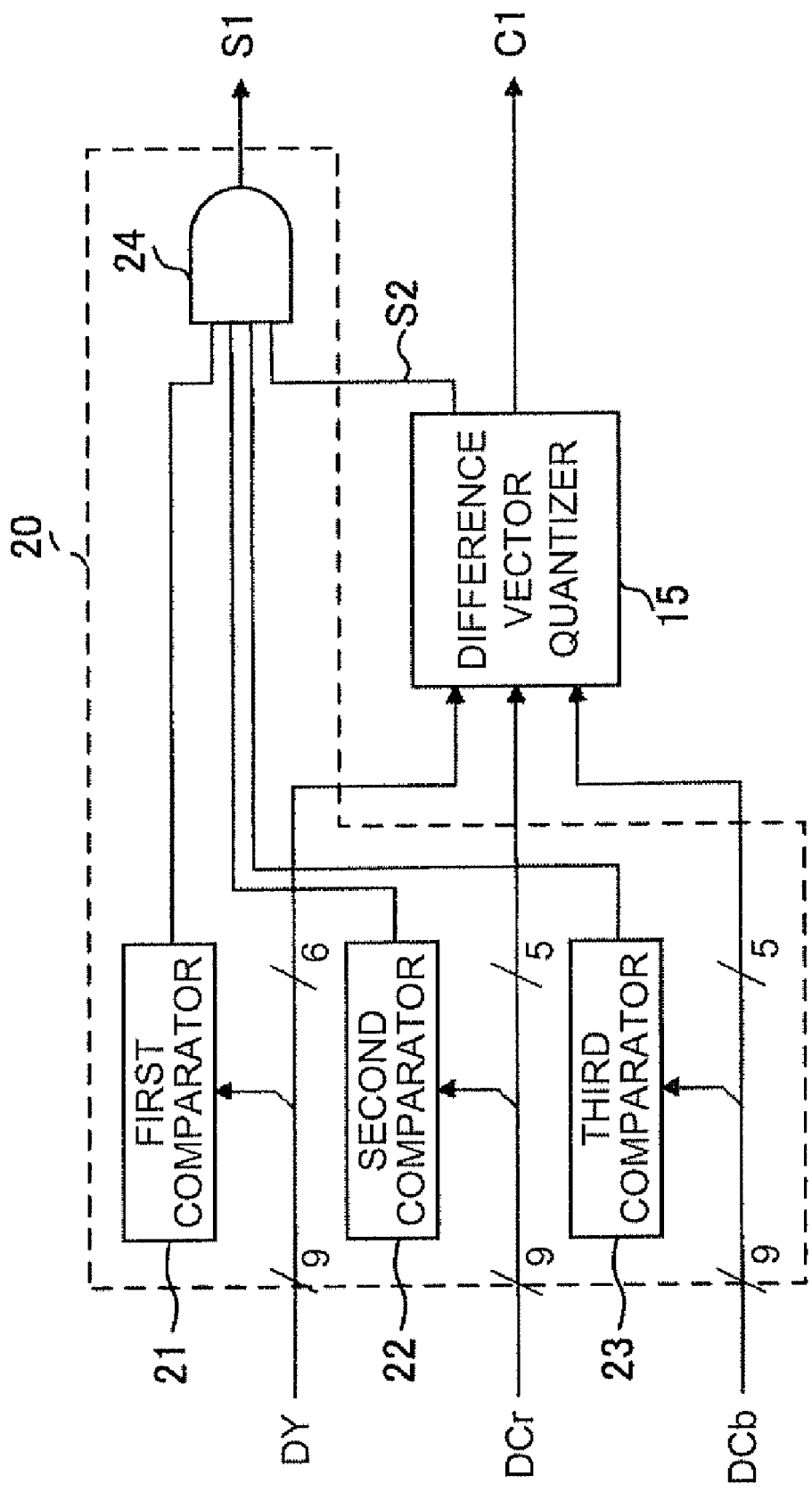
FIG. 4 is a circuit block diagram schematically showing a determination unit and a difference vector quantizer shown in FIG. 2.
Figure 6:
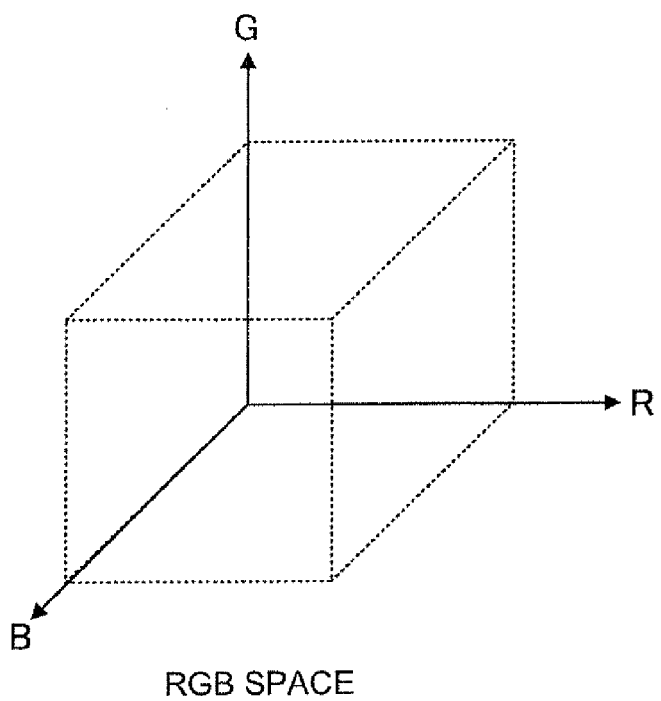
FIG. 6 is a diagram schematically showing an absolute value vector quantization space when a color image signal is RGB.

FIG. 4 is an example of a circuit block diagram of the determination unit 20 and the difference vector quantizer 15. As described above, if each bit of Y, Cr, and Cb is 8 bits, (Y: 0 to 255, Cr and Cb: −128 to +127), each component difference value DY, DCr, DCb which is an output from the difference device 11 is respectively within a range of −255 to +255. Therefore, as shown in FIG. 6, as each component difference value DY, DCr, and DCb which is an input to the difference vector quantizer 15, 9 bits are respectively required.

The determination unit 20 includes a first comparator 21, a second comparator 22, and a third comparator 23. The first comparator 21 compares a Y component difference value DY with an upper limit and a lower limit so as to determine whether the Y component difference value DY is within its comparison range. When the component difference value DY is within the comparison range, the first comparator 21 outputs a logical 1. When the component difference value DY is outside the comparison range, the comparator 21 outputs a logical 0. The second and the third comparators 23 and 23 compare inputted component difference values DCr, and DCb with the respective comparison ranges in the same manner. When the component difference values are within the respective comparison ranges, the comparators respectively output a logical 1. When the component difference values are outside the respective comparison ranges, the comparators respectively output a logical 0.

In addition, in the embodiment, the comparison range of the first comparator 21 which compares the Y component difference value DY is −64≦DY<+64, and the comparison ranges of the second and the third comparator 22 and 23 are respectively −32≦DCr and DCb<+32, for example.

The outputs of the first to the third comparator 21 to 23 are inputted to a code selection signal generating unit, an AND circuit 24 for example. Here, in FIG. 4, a determination signal S2 from the difference vector quantizer 15 is also inputted to the AND circuit 24. This will be described later.

First, a relationship of outputs of the first to the third comparator 21 to 23 and an output of the AND circuit 24 will be described. When the outputs of the first to the third comparator 21 to 23 are at least a logical 1, the AND circuit 24 outputs a logical 1 which is a valid signal as the code selection signal S1. In other words, the component difference values DY, DCr, and DCb are within the respective comparison ranges, that is the difference value V1 is small, the code selection signal S1 can be valid. Any one of the component difference values DY, DCr, and DCb is outside the respective comparison ranges, that is the difference value V1 is large, the code selection signal S1 which is the output of the AND circuit 24 becomes invalid (a logical 0). In this case, the absolute value vector quantization mode is selected as described above.

As shown in FIG. 4, the difference vector quantizer 15 to which the outputs of the first to the third comparator 21 to 23 are inputted is provided. The difference vector quantizer 15 selects a quantization representative value which is the spatially closest to a coordinate determined by each component difference value of CY, DCr, and DCb inputted thereto out of M number of quantization representative values arranged in the virtual three-dimensional space shown in FIG. 3, and outputs a unique code assigned to the representative value as the difference vector quantization C1. The difference vector quantizer 15 may include a table, a logic synthesis unit, a ROM, and the like. The table is tabulated quantization representative values in the difference vector quantization. That is, operations of the table, the logic synthesis unit, the ROM, and the like which are included to the difference vector quantizer 15 are equivalent to selecting a quantization representative value which is the spatially closest to a coordinate determined by each difference value of DY, DCr, and DCb inputted thereto out of M number of quantization representative values arranged in the virtual three-dimensional space shown in FIG. 3.

In this time, to the difference vector quantizer 15, lower-order bit groups of the component difference values DY, DCr, and DCb are inputted instead of the component difference values DY, DCr, and DCb of each 9 bits. In the case where the component difference values DY, DCr, and DCb of each 9 bits are within the respective comparison ranges, higher-order bits are ignored. In this case, in regard to the Y component difference value DY, lower-order 6 bits are inputted to the difference vector quantizer 15. In regard to the Cr component difference value DCr and the Cb component difference value DCb, lower-order 5 bits are respectively inputted to the difference vector quantizer 15. The lower-order 6 bits of the Y component difference value DY is a value within the comparison range in the first comparator 21. The lower-order 5 bits of the Cr component difference value DCr and the Cb component difference DCb are values within the respective comparison ranges in the second and the third comparator 22 and 23. Since the number of inputted bit can be thus reduced, a circuit size can be reduced.

Here, as shown in FIG. 4, the determination signal S2 from the difference vector quantizer 15 is inputted to the AND circuit 24. The reason is that, as shown in FIG. 3, within a rectangular parallelepiped space surrounded by an upper threshold and a lower threshold of the respective comparison ranges (not shown), the plurality of the difference vector quantization representative values is not arranged at corners that are not included to a sphere in the rectangular parallelepiped space, but arranged in the sphere. Therefore, if an existing space of the quantization representative values is not the rectangular parallelepiped but the sphere, a region to which the representative values cannot be assigned in the difference vector quantizer 15 exists even if an input value is within its comparison range of the first to the third comparator 21 to 23. In such a case, the determination signal S2 from the difference vector quantizer 15 becomes a logical 0 (not quantizing), and the code selection signal S1 of the AND circuit 24 becomes a logical 0 by the determination signal S2. As a result, the absolute value vector quantization mode is selected. In addition, if an existing space of the quantization representative values is a sphere as shown in FIG. 3, M number of representative values can be efficiently assigned.

The difference vector inverse quantizer 30 performs a local decoding process to generate a prediction pixel value V5 which is fed back to the difference device 11. The difference vector inverse quantizer 30 inverse quantizes the quantization representative value (0 to M−1) which is the difference vector quantization code C1 so as to generate a difference inverse quantization value V2. Since the difference inverse quantization value V2 inverse quantizes a quantization representative value shown in FIG. 3, the difference inverse quantization value V2 does not always match with the difference value V1, and a quantized error occurs. However, as described above, since the number of M, the difference vector quantization representative values with respect to the total number of codes N, is assigned to faithfully reproduce an area of an image where changes gradually, deterioration of image quality in accordance with the quantized error can be minimized.

The adder 40 adds the prediction pixel value V5 which is a pixel of the previous stage delayed in the pixel delay circuit 80 to the difference inverse quantization value V2, so as to generate a difference quantization local decoding pixel value V3.

Quantization in Absolute Value Vector Quantization Mode

Next, the absolute value vector quantization mode will be described. To the absolute value vector quantization unit 50, as each component of an input color pixel, the luminance signal Y and the color difference signals Cr, Cb are inputted. The absolute value vector quantization unit 50, as shown in FIG. 5, selects a quantization representative value which is the spatially closest to the coordinate determined by each difference value of the components inputted thereto out of (N−M) number of quantization representative values arranged in the three-dimensional space where the respective components of Y, Cb, Cr are axes, and outputs a unique code assigned to the representative value as an absolute value vector quantization code C2.

Here, an arrangement of the quantization representative values of the absolute value vector quantization shown in FIG. 5 will be described by comparing with the quantization representative values in the RGB space shown in FIG. 6. In the RGB space shown in FIG. 6, the quantization values wholly exist in a rectangular parallelepiped space shown in FIG. 6.

Figure 5:
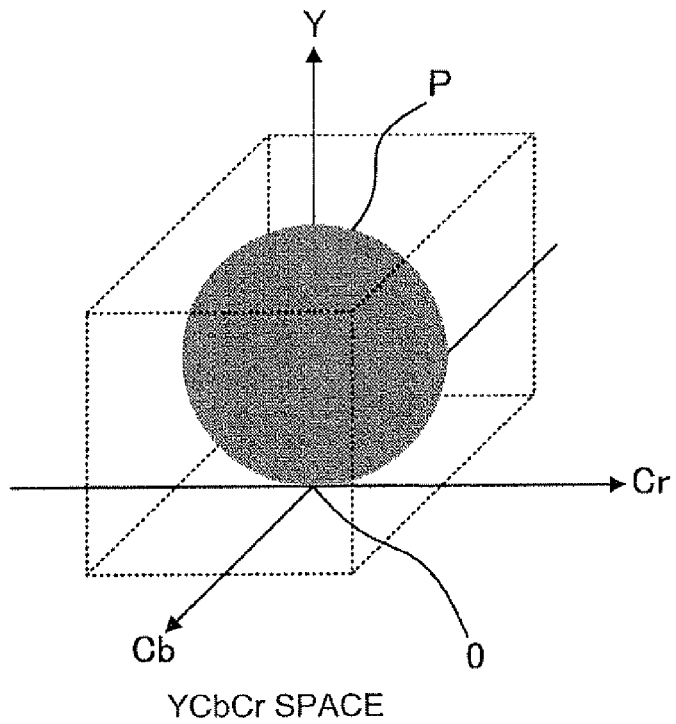
FIG. 5 is a diagram schematically showing a distribution of (N−M) number of quantization representative values arranged in a virtual absolute value vector quantization space.

However, in the YCbCr space shown in FIG. 5, a space where the quantization values exist is not in the rectangular parallelepiped space but in the sphere. This is because if R=G=B=0 to 255, the component values RGB and YCbCr have a relationship described below.

$Y = 0.257R + 0.504G + 0.098B + 16$ $Cb = -0.148R - 0.291G + 0.439B + 128$ $Cr = 0.439R - 0.368G - 0.071B + 128$

The sphere includes a center which passes through a Y axis, a vertex P, and an origin zero. The vertex P (Y: the maximum value 255, Cb=C=0) means a pure white pixel values and the origin zero (Y=Cb=C=0) which is an intersection of the Y axis, a Cr axis, and a Cb axis means a pitch-black pixel value.

Thus, since the YCbCr space shown in FIG. 5 is narrower than the RGB space shown in FIG. 6, a finite (N−M) number of the absolute value vector quantization representative values can be relatively closely arranged. Accordingly, the absolute value vector quantization in the YCbCr space makes efficient encoding possible without having wasted codes compared with encoding in the RGB space.

Figure 7:
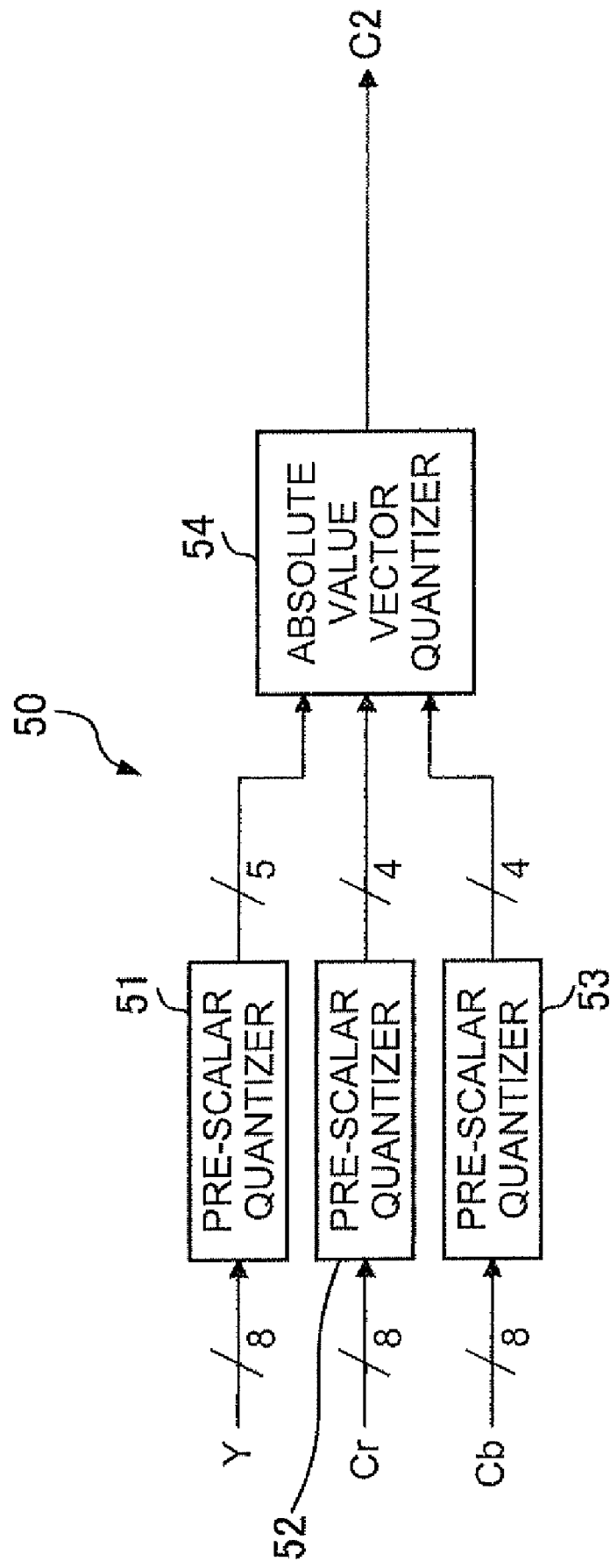
FIG. 7 is a circuit block diagram schematically showing of an absolute value vector quantization unit shown in FIG. 2.

FIG. 7 shows one example of the absolute value vector quantization unit 50. Respective bits of Y, Cr, and Cb, an input to the absolute value vector quantization unit 50, are 8 bits (Y: 0 to 255, Cr and Cb: −128 to +127).

The significance of the absolute value vector quantization in the absolute value quantization unit 50 is that when the difference vector quantization mode is not selected, that is, when a difference between a previous pixel and a pixel value is large, the quantization is performed only with an object pixel without depending on the previous pixel. In this case, the absolute value vector quantization in the YCrCb space shown in FIG. 5, not in the RGB space shown in FIG. 6, has an advantage of an efficient use of a finite (N−M) number of representative values. However, when the respective bits of Y, Cb, and Cr are 8 bits, 24 bits in total are used as they are, a circuit size of the absolute value vector quantization unit 50 is enlarged.

Therefore, as shown in FIG. 7, pre-scalar quantizers 51 to 53 are provided for bit reduction of the respective 8 bits of the Y, Cr, Cb serving as an input. The pre-scalar quantizers 51 to 53 quantize the Y component into higher-order 5 bits, and respectively quantize the Cr and the Cb components into higher-order 4 bits. The components are quantized into the higher-order bits since quantizing finely using lower order-bits is less required in the absolute value vector quantization. It is because the absolute value vector quantization is selected when at least one of the difference values exceeds the comparison range.

Then, the higher-order 5 bits of the Y component and the respective higher-order 4 bits of the Cr and the Cb components are inputted to an absolute value vector quantizer 54. The absolute value vector quantizer 54 outputs a representative value which is the closest to the input value out of the representative values in the sphere of the YCrCb shown in FIG. 5. The absolute value vector quantizer 54 may also include the table, the logic synthesis unit, the ROM, and the like.

The absolute value vector inverse quantizer 60 shown in FIG. 2 performs a local decoding process to generate the prediction pixel value V5 which is fed back to the difference device 11. The absolute value vector inverse quantizer 60 inverse quantizes the absolute value vector quantization representative value which is the absolute value vector quantization code C2 so as to generate an absolute value local decoding pixel value V4. Since the absolute value local decoding pixel value V4 inverse quantizes a quantization representative value of the sphere shown in FIG. 5, the absolute value local decoding pixel value V4 does not always match with the YCrCb components of an input value, and a quantized error occurs. However, as described above, since the number of (N−M) which is the absolute value vector quantization representative values with respect to the total code number N is assigned to faithfully reproduce an area of an image where changes abruptly, deterioration of image quality in accordance with the quantized error can be minimized.

The prediction value selector 70, based on the code selection signal S1 from the determination unit 20, selects and outputs the difference quantization local decoding pixel value V3 when logic of the signal S1 is 1, and selects and outputs the absolute value local decoding pixel value V4 when logic of the signal S1 is 0.

The pixel delay circuit 80 delays an output of the prediction value selector 70. The prediction pixel value V5 which is an output from the pixel delay circuit 80 is inputted to the difference device 11 and the adder 40 as a previous pixel value.

In the embodiment, the encoded output C (C1 or C2) is one of the difference vector quantization code C1 which relatively faithfully reproduces an area of an image where changes gradually and the absolute value vector quantization code C2 which relatively faithfully reproduces an area of an image where changes abruptly. Therefore, an area of an image where changes gradually and an area of an image where changes abruptly can be relatively faithfully reproduced, thereby image quality of an encoded image can be improved. Especially, since an edge part where gray scale varies greatly is encoded by the absolute value vector quantization which does not depend on the previous pixel, even if the edge part is encoded, a large quantization noise does not occur.

Further, since an image can be encoded without blocking in the embodiment, a blocking method for encoding in units of a block is unnecessary. Accordingly, cost can be reduced.

Operation of Image Encoding Device

Figure 8:
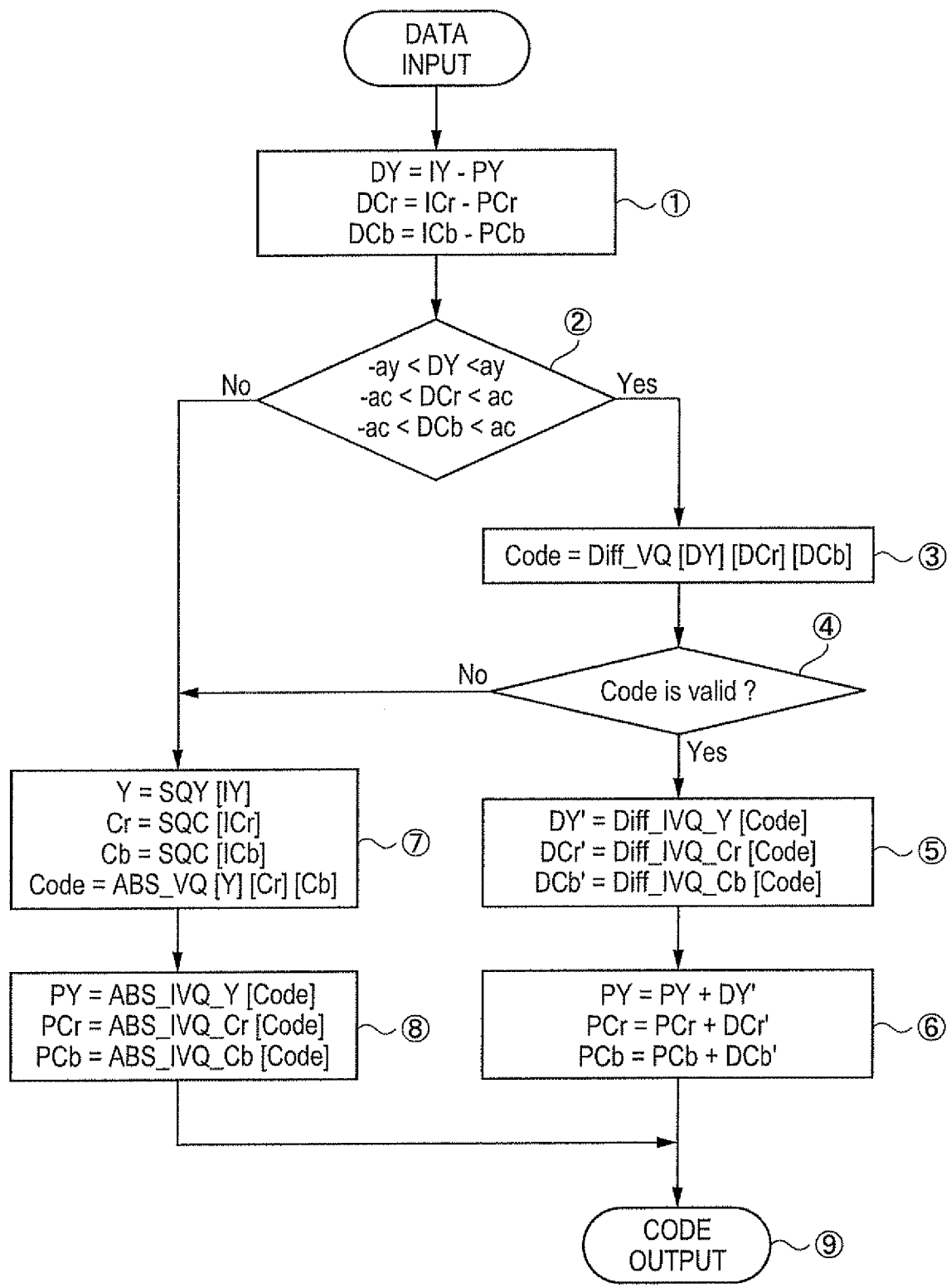
FIG. 8 is an operational flowchart of the image encoding device.

FIG. 8 is an operational flowchart of the image encoding device 1. In FIG. 8, when data is inputted, in the difference device 11 shown in FIG. 2, each component YCrCb is obtained by subtracting (a step ST1). That is, if input Y data is denoted as IY, input Cr data is denoted as ICr, input Cb data is denoted as ICb, prediction Y data is denoted as PY, prediction Cr data is denoted as PCr, and the prediction Cb data is denoted as PCb, the difference values of the respective components DY=IY−PY, DCr=ICr−PCr, and DCb=ICb−PCb are satisfied. The prediction data is outputted from the pixel delay circuit 80.

Next, the first to the third comparator 21 to 23 shown in FIG. 4 determine whether each difference value of the components DY, DCr, and Cb is within or outside the respective comparison ranges (a step ST2). That is, if a difference threshold for the luminance signal Y is denoted as ay, and a difference threshold for the luminance signal C is denoted as ac, each difference value of the components DY, DCr, and DCb is determined whether they are within or outside respective ranges of −ay<DY<ay, −ac<DCr<ac, and −ac<DCb<ac. If any one of these three comparison results is outside the range, the determination of the step ST2 becomes "NO," thereby the step moves to a step ST4 so as to select the "absolute value vector quantization mode."

If the determination of the step ST2 is "YES," in the difference vector quantizer 15 shown in FIG. 4, Diff_VQ[DY][DCr][DCb], as the difference vector quantization code C1 corresponding to the input value, is outputted from the table, for example. If the difference vector quantization code C1 exists in the difference vector quantization space shown in FIG. 3 and valid, the determination signal S2 from the difference vector quantizer 15 shown in FIG. 4 become a logical 1. In this case, the encode selection signal S1 which is an output from the AND circuit 24 shown in FIG. 4 in a step ST4 becomes a logical 1, thereby the difference vector quantization becomes valid. However, if the input value inputted to the difference vector quantizer 15 does not exist in the difference vector quantization space shown in FIG. 3, the determination signal S2 from the difference vector quantizer 15 shown in FIG. 4 becomes a logical 0. In this case, the code selection signal S1 which an output from the AND circuit 24 shown in FIG. 4 in the step ST4 becomes a logical 0 (the difference vector quantization mode becomes invalid). As a result, the determination of the step ST4 becomes "NO," and the step moves to a step ST7.

If the determination of the step ST4 is "YES," in the difference vector inverse quantizer 30 shown in FIG. 2, the difference vector quantization code C1 (Diff_VQ[DY][DCr][DCb]) is inverse quantized per component (a step ST5). That is, from the difference vector inverse quantizer 30, DY'=Diff_IVQ_Y[Code], DCr'=Diff_IVQ_Cr[Code], DCb'=Diff_IVQ_Cb[Code] as the difference vector inverse quantization value V2 of the respective components are outputted from the table, for example. Then, in the adder 40 shown in FIG. 2, the prediction pixel value V5 is added to the difference vector inverse quantization value V2 of the respective components (a step ST6). Here, if the prediction pixel values of each component based on the previous object pixel values are respectively denoted as PY, PCr, PCb, the prediction pixel values PY, PCr, PCb are renewed to PY=PY+DY', PCr=PCr+DCr', PCb=PCb+DCr' as new prediction pixel values PY, PCr, PCb based on the present object pixel values.

On the other hand, if the determination of the step ST2 becomes "NO" as described above, the step moves to the step ST7 so as to select the "absolute value vector quantization mode." In the step ST7, in the pre-scalar quantizer 51 to 53 shown in FIG. 7, each component value Y, Cr, and Cb are scalar quantized, and Y=SQY[Y], Cr=SQY[Cr], and Cb=SQY[Cb] are outputted from the table, for example. Further, in the absolute value vector quantizer 54 shown in FIG. 7, as the absolute value vector quantization code C2, Code=ABS_VQ[Y][Cr][Cb] is outputted from the table, for example.

In a step ST8, in the absolute value vector inverse quantizer 60 shown in FIG. 2, an absolute value quantization local decoding pixel value V4 which is an inverse quantized absolute value vector quantization code C2 is generated. That is, as the new prediction pixel values PY, PCr, and PCb, PY=ABS_VQ[Y], PCr=Code=ABS_VQ[Cr], PCb=Code=ABS_VQ[Cb] are outputted from the table, for example.

Further, one of the two kinds of prediction pixel values V3 and V4 obtained in the steps ST6 and ST8 is selected in the prediction value selector 70 in accordance with the code selection signal S1. Then, the prediction pixel value V5 is generated through the pixel delay circuit 80. That is, if the code selection signal S1 is a logical 1, the prediction value V3 is selected, and if the code selection signal S1 is a logical 0, the prediction pixel value V5 is selected. The prediction pixel value V5 is fed back to the difference device 11.

In addition, based on the determination made in the step ST4, in the code selector 90 shown in FIG. 2 selects one of the difference vector quantization code C1 obtained in the step ST3 and the absolute value vector quantization code C2 obtained in the step ST7 so as to output the encoding signal C (C1 or C2) (a step ST9). That is, if the code selection signal S1 is a logical 1, the difference vector quantization code C1 is selected, and if the code selection signal S1 is a logical 0, the absolute value vector quantization code C2 is selected. In addition, timing of code output of the step ST9 may be timing before the steps ST5, ST6, and ST8.

Image Decoding Device

Figure 9:
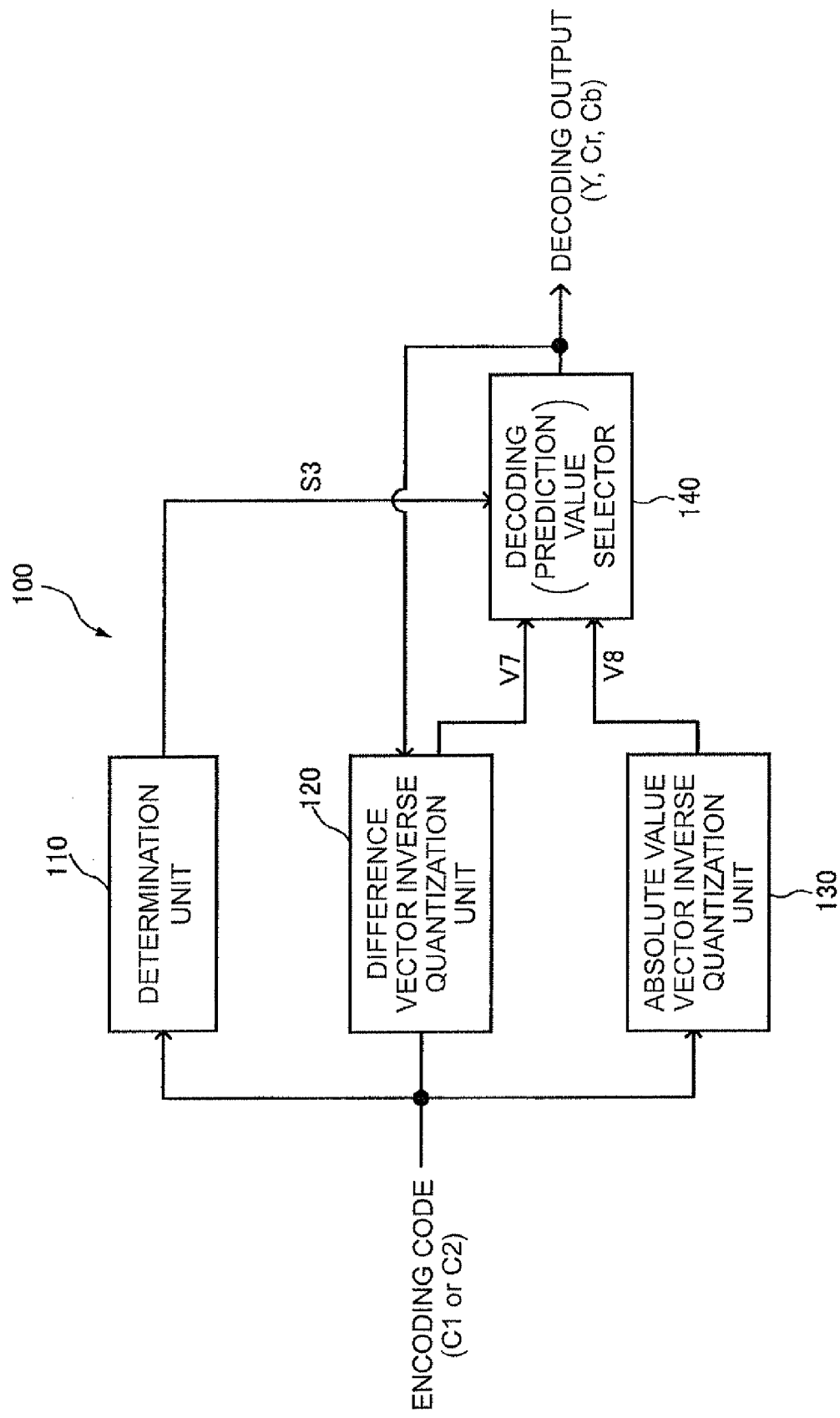
FIG. 9 is a block diagram schematically showing an image decoding device according to the embodiment of the invention.

Next, an image decoding device will be described with reference to FIG. 9. FIG. 9 is a block diagram schematically showing an image decoding device 100 according to one embodiment of the invention. In FIG. 9, the image decoding device 100 vector inverse quantizes and decodes the encoding signal C (C1 or C2) which is encoded by the image encoding device shown in FIGS. 1 and 2. The image decoding device 100 roughly includes a determination unit 110, a difference vector inverse quantization unit 120, an absolute value vector inverse quantization unit 130, and a decoding selector 140.

To the determination unit 110, the encoding signal C (C1 or C2) is inputted. Then, the determination unit 110 determines the encoding signal C is whether the difference vector quantization code C1 or the absolute value vector quantization code C2 so as to output a code determination signal S3. To the difference vector inverse quantization unit 120, the encoding signal C (C1 or C2) is inputted. Then, the difference vector inverse quantization unit 120 inverse quantizes and decodes the difference vector quantization code C1 out of the encoding signals C1 and C2. To the absolute value vector inverse quantization unit 130, the encoding signal C (C1 or C2) is inputted. Then, the absolute value vector inverse quantization unit 130 inverse quantizes and decodes the absolute value vector quantization code C2 out of the encoding signals C1 and C2. The decoding selector 140, based on the code determination signal S3 from the determination unit 110, selects one of an output from the difference vector inverse quantization unit 120 and an output from the absolute value vector inverse quantization unit 130 so as to output a decoding signal (Y, Cr, and Cb).

Here, the image decoding device 100 shown in FIG. 9 performs one of a difference vector inverse quantization mode performed in the difference vector inverse quantization unit 120 and an absolute value inverse quantization mode performed in the absolute value vector inverse quantization unit 130 based on an output from the determination unit 110, the encoded signal C (C1 or C2) in the image encoding device 1 shown in FIGS. 1 and 2.

Here, the encoding signal is any one of N number of codes. M (M<N) number of codes out of N number of codes are difference vector quantized codes, and (N−M) number of code out of N number of codes are absolute value vector quantized codes. Therefore, the determination unit 110 determines the code of the encoding signal is whether the code C1 that belongs to M number of codes or the code C2 that belongs to (N−M) number of codes.

More specifically, the encoding signal C (C1 or C2) is a code of 0 to N−1 as described above. If the encoding signal is the difference vector quantized code C1, the number of codes is 0 to M−1. If the encoding signal is the absolute value vector quantized code C2, the number of codes is M to N−1. Therefore, the determination unit 110 can determine if the inputted encoding signal (C1 or C2) is 0 to M−1, logic of the code determination signal S3 is 1 (the difference vector inverse quantization mode) and if the inputted encoding signal (C1 or C2) is M to N−1, logic of the code determination signal S3 is 0 (the absolute value vector inverse quantization mode).

Next, the difference vector inverse quantization unit 120 will be described with reference to FIG. 10. The difference vector inverse quantization unit 120 includes a difference vector inverse quantizer 121, a pixel delay circuit 122, and an adder 123. Further, the decoding selector 140 is also used as a prediction value selector to generate a prediction pixel value V9. The prediction pixel value V9 is added to the adder 123.

The difference vector inverse quantizer 121 may have the same structure as the difference vector inverse quantizer 30 shown in FIG. 2. That is, the difference vector inverse quantizer 121 generates a difference inverse quantization value V6 inputted to the adder 123. The difference vector inverse quantizer 121 inverse quantizes the quantization representative value (0 to M−1) which is the difference vector quantization code C1 so as to generate the difference inverse quantization value V6. Since the difference inverse quantization value V6 inverse quantizes a quantization representative value shown in FIG. 3, the difference inverse quantization value V6 does not always match with the difference value V1, and a quantized error occurs in the same manner as the difference vector inverse quantizer 30 shown in FIG. 2. However, as described above, since the number of M which is the difference vector quantization representative values with respect to the total code number N is assigned to faithfully reproduce an area of an image where changes gradually, deterioration of image quality in accordance with the quantized error can be minimized.

The adder 123 adds the prediction pixel value V9 to the difference inverse quantization value V6 so as to generate a difference quantization decoding pixel value V7. The prediction pixel value V9 is a prediction value (code outputs Y, Cr, and Cb) of a previous pixel selected in the prediction value selector 140 is delayed in the pixel delay circuit 122.

Figure 10:
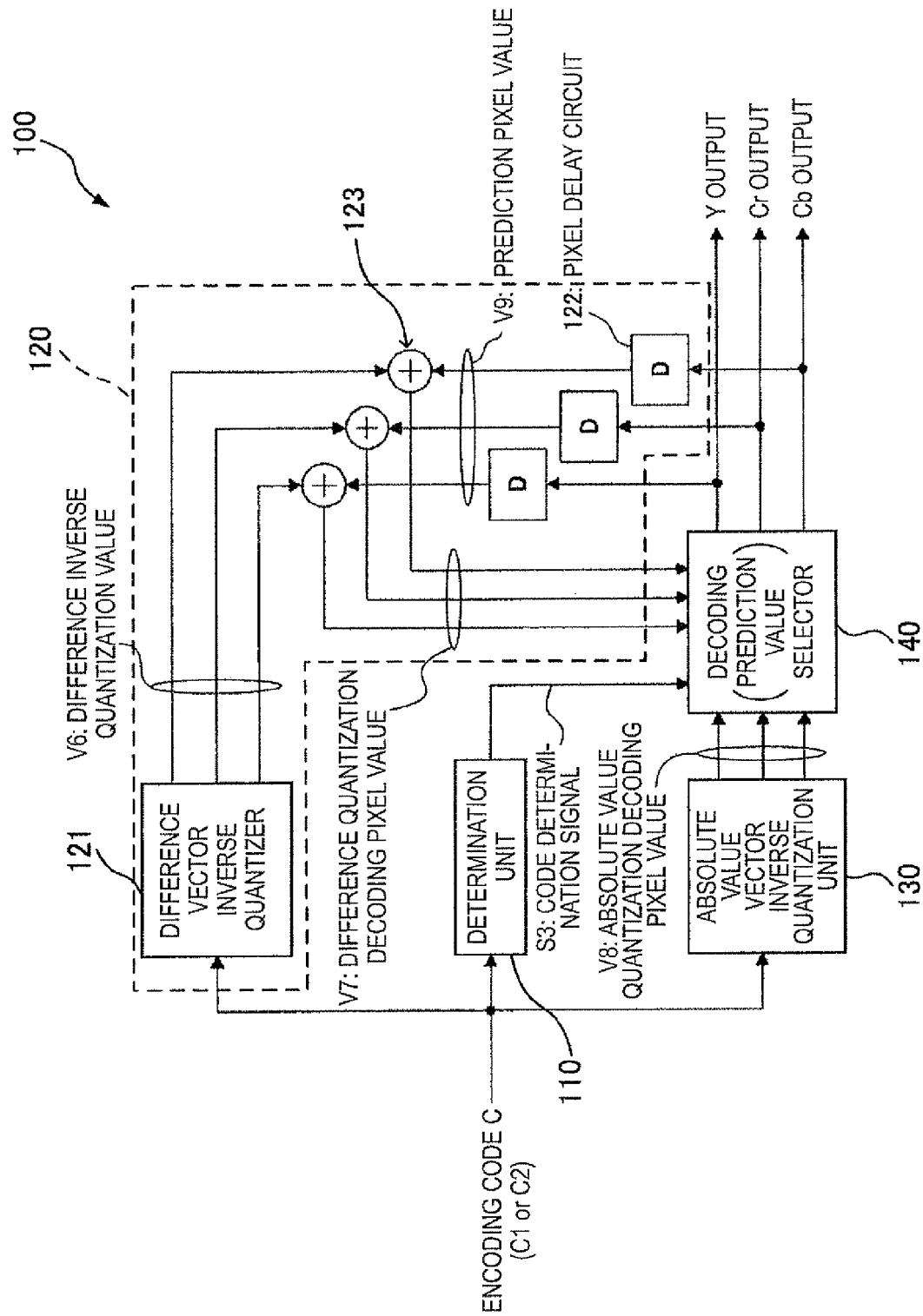
FIG. 10 is a block diagram schematically showing a detail of a difference vector inverse quantization unit of the image decoding device shown in FIG. 9.

The absolute value vector inverse quantization unit 130 shown in FIGS. 9 and 10 may have the same structure as the absolute value vector inverse quantizer 60 shown in FIG. 2. The absolute value vector inverse quantization unit 130 inverse quantizes the absolute value vector quantization representative value (M to N−1) which is the absolute value vector quantization code C2 so as to generate an absolute value local decoding pixel value V8. Since the absolute value local decoding pixel value V8 inverse quantizes a quantization representative value in the sphere shown in FIG. 5, the absolute value local decoding pixel value V8 does not always match with the YCrCb components which is an input value inputted to the image encoding device 1 shown in FIGS. 1 and 2, thereby a quantized error occurs. However, as described above, since the number of (N−M) which is the absolute value vector quantization representative values with respect to the total code number N is assigned to faithfully reproduce an area of an image where changes abruptly, deterioration of image quality in accordance with the quantized error can be minimized.

The decoding (prediction value) selector 140, based on the code determination signal S3 from the determination unit 20, selects and outputs the difference quantization local decoding pixel value V7 when logic of the signal S3 is 1 (the difference vector inverse quantization is valid), and selects and outputs the absolute value local decoding pixel value V8 when logic of the signal S3 is 0 (the difference vector inverse quantization is invalid). An output of the decoding (prediction value) selector 140 becomes a decoded output (Y, Cr, and Cb).

That is, the decoded output (Y, Cr, and Cb) is one of the difference quantization local decoding pixel value V7 which relatively faithfully reproduces an area of an image where changes gradually and the absolute value local decoding pixel value V8 which relatively faithfully reproduces an area of an image where changes abruptly. Therefore, both an area of an image where changes gradually and an area of an image where changes abruptly can be relatively faithfully reproduced, thereby image quality of an encoded image can be improved. Especially, since an edge part where gray scale varies greatly is encoded by the absolute value vector quantization which does not depend on the previous pixel, even if the edge part is encoded, a large quantization noise does not occur.

Further, since an image can be decoded without blocking the image in the embodiment, a deblocking method for decoding the image encoded in units of a block is unnecessary. Accordingly, cost can be reduced.

Operation of Image Decoding Device

Figure 11:
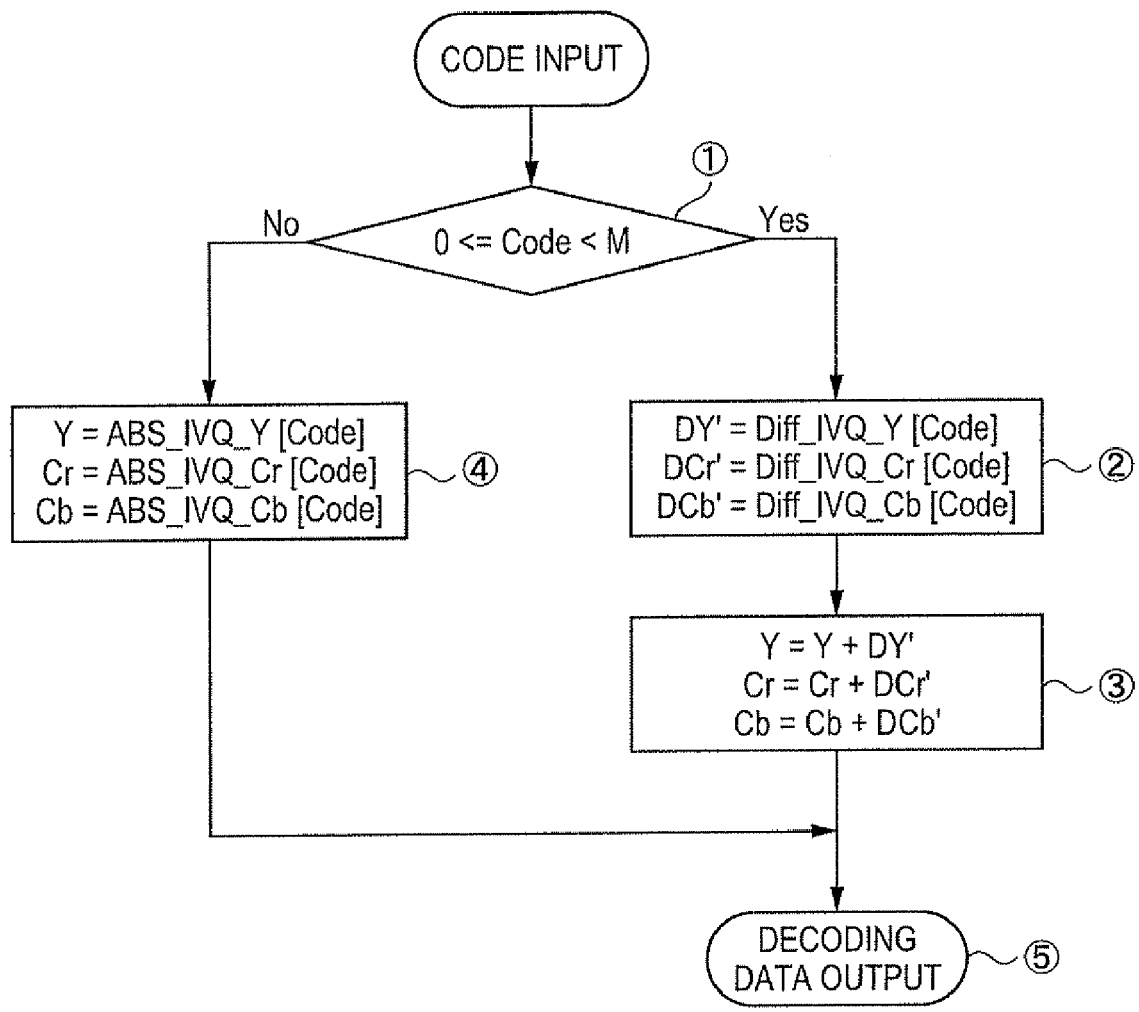
FIG. 11 is an operational flowchart of the image decoding device.

FIG. 11 is an operational flowchart of the image decoding device 100 shown in FIG. 10. In FIG. 11, when the encoding signal C is inputted, the determination unit 110 determines whether the encoding signal C is $0 \leqq C < M$ or not (a step ST1). That is, the determination unit 110 determines that if the inputted encoding signal (C1 or C2) is 0 to M−1, logic of the code determination signal S3 is 1 (the difference vector inverse quantization mode) and if the inputted encoding signal (C1 or C2) is M to N−1, logic of the code determination signal S3 is 0 (the absolute value vector inverse quantization mode).

If the determination of the step ST1 in FIG. 11 is "YES," the difference vector inverse quantization mode is performed in the difference vector inverse quantization unit 120 (a step ST2). That is, from the difference vector inverse quantizer 121 of the difference vector inverse quantization unit 120, DY'=Diff_IVQ_Y[Code], DCr'=Diff_IVQ_Cr[Code], and DCb'=Diff_IVQ_Cb[Code] as the difference inverse quantization value V6 are outputted from the table, for example.

Then, the step moves to a step ST3 of FIG. 11. In the step ST3, in the adder 123, the prediction value V9 of the previous pixel is added to the difference inverse quantization value V6 (Dy', DCr', and DCb') so as to obtain decoded codes Y, Cr, and Cb. Here, since the prediction values of the previous pixel are the codes Y, Cr, and Cb outputted in the previous time, in the adder 123, the difference inverse quantization value V6 (Dy', DCr', and DCb') are added to the previous code outputs Y, Cr, and Cb as the present code outputs Y, Cr, and Cb. That is, in the adder 123, Y=Y+Dy', Cr=Cr+DCr', and Cb=Cb+DCb' are calculated. Thus, the difference quantization decoding pixel value V7 that the difference vector quantization code C1 is inverse quantized is obtained.

On the other hand, if the determination of the step ST1 in FIG. 11 is "NO," the absolute vector inverse quantization mode is performed in the absolute value vector inverse quantization unit 130 (a step ST4). That is, the absolute value vector inverse quantization unit 130 outputs Y=ABS_IVQ_Y[Code], Cr=ABS_IVQ_Cr[Code], Cb=ABS_IVQ_Cb[Code] as the absolute value inverse quantization pixel value V8 from the table, for example.

In a step ST5 in FIG. 11, based on the code determination signal S3 from the determination unit 110, the decoding selector 140 selects and outputs one of the difference quantization decoding pixel vale V7 outputted from the difference vector inverse quantization unit 120 and the absolute value quantization decoding pixel value V8 outputted from the absolute value vector inverse quantization unit 130.

In addition, the decoding selector 140 is also used as a prediction value selector, and supplies its output to the difference vector inverse quantization unit 120 as a prediction value of the previous pixel.

Integrated Circuit Device

Figure 12:
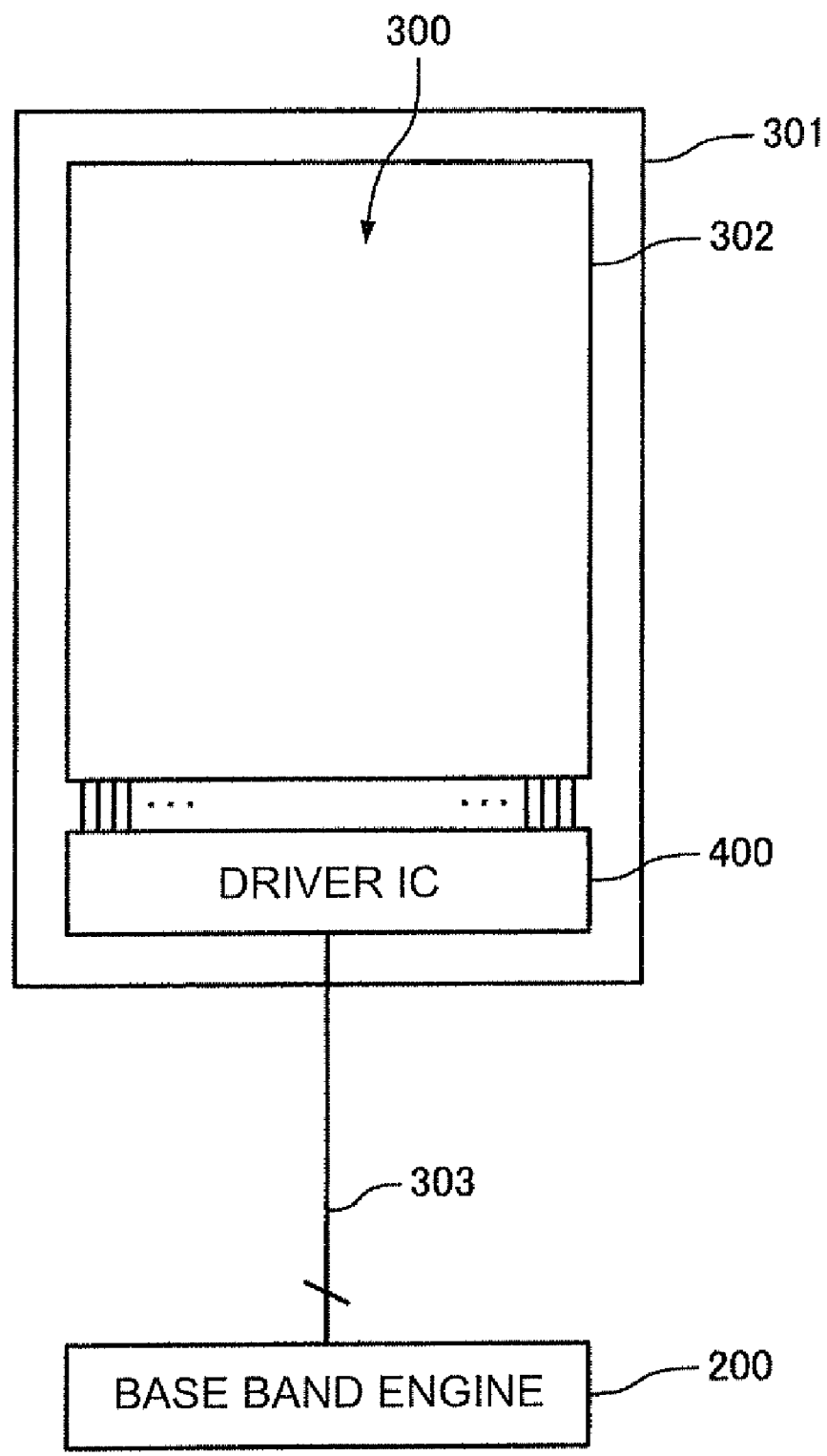
FIG. 12 is a diagram showing an example of an electronic apparatus to which the image encoding device and the image decoding device of the embodiment are provided.

FIG. 12 shows an embodiment applying an image output system to a cellular phone as an electronic apparatus. In FIG. 12, a base band engine (BBE: a first integrated circuit in a broad sense) 200 is a large scale integrated circuit (LSI) that controls basic functions of a cellular phone, and is an output source of videos and still images received via the Internet, natural images taken by a camera, menu screens required for operating a cellular phone, and various image data such as characters, graphic information, and the like.

In FIG. 12, a display panel of a cellular phone, for example, a liquid crystal panel 300 is provided. The liquid crystal panel 300 is composed of two glass substrates 301 and 302, and liquid crystal sealed therebetween. The glass substrate 301 which is a larger substrate is an active matrix substrate, and a thin film transistor (TFT) serving as an active element is provided to each pixel. A transparent pixel electrode is coupled to a drain terminal of the TFT of each pixel, a source line serving as a data line is couples to a source terminal, and the data line serving as a scanning line is coupled to a gate terminal. A transparent electrode is provided to the glass substrate 302 that faces to the glass substrate 301. On the glass substrate 301, a driver IC (a second integrated circuit in a board sense) 400 for driving the liquid crystal panel 300 is mounted by COG along a short edge of the glass substrate 301. The driver IC 400 supplies a scanning signal to the gate line and a data signal to the source line of the liquid crystal panel 300 so that the liquid crystal panel 300 is driven to display.

The base band engine 200 and the driver IC 400 are coupled with a plurality of bus lines 303, and image data, horizontal and vertical synchronizing signals, a clock signal, and various commands are transferred.

Figure 13:
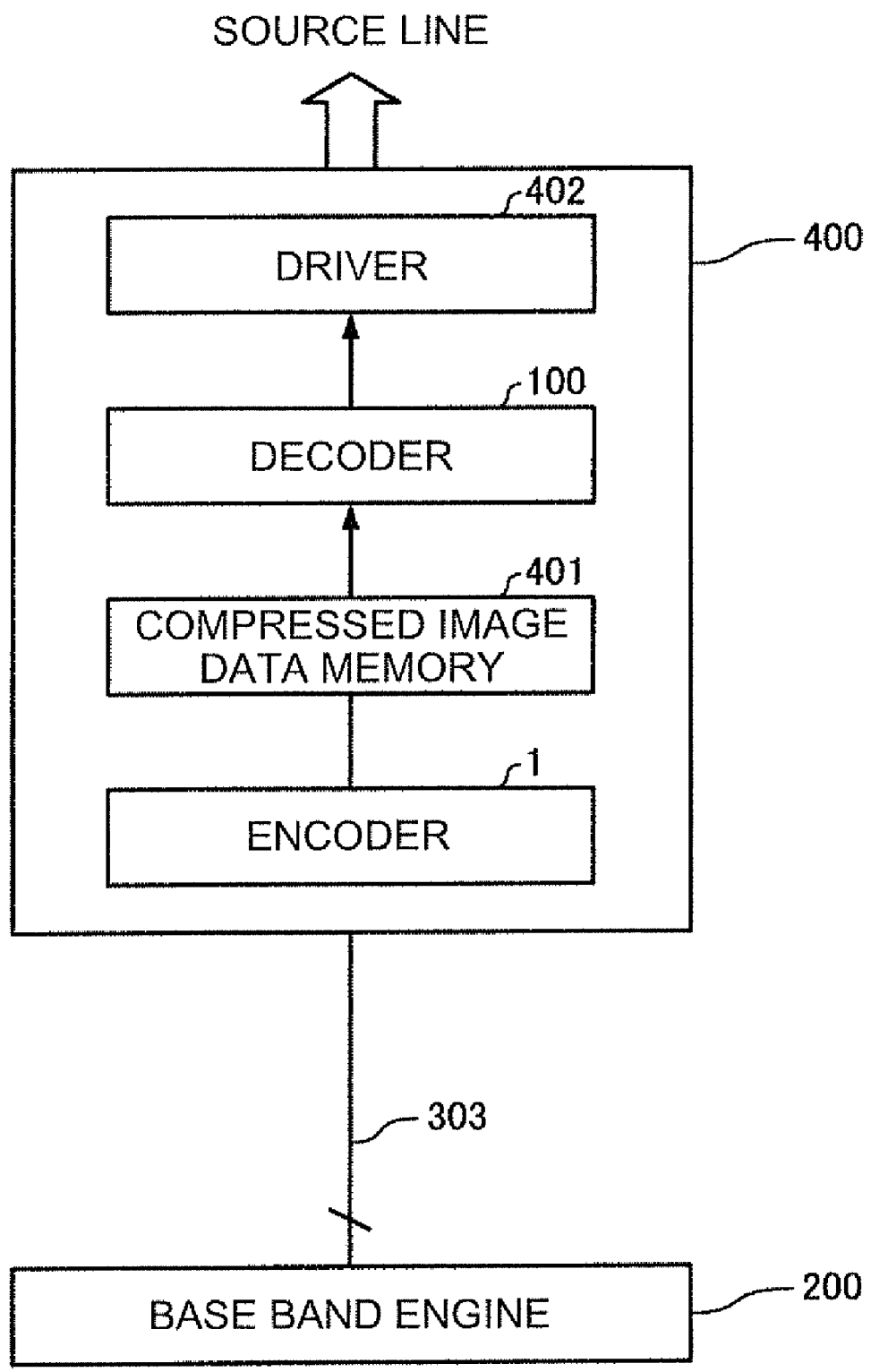
FIG. 13 is a diagram showing an example of an arrangement of the image encoding device and the image decoding device provided to the electronic apparatus shown in FIG. 12.

In the embodiment, as shown in FIG. 13, the driver IC 400 is provided with the image encoding device (also referred to as an encoder) 1, a compressed image data memory 401, the image decoding device (also referred to as a decoder) 100, and a driver 402 for driving the liquid crystal panel 300 based on encoded image data. Thus, a memory capacity of the compressed image data memory 401 can be reduced. As a result, miniaturization of the driver IC 400 is achieved.

Figure 14:
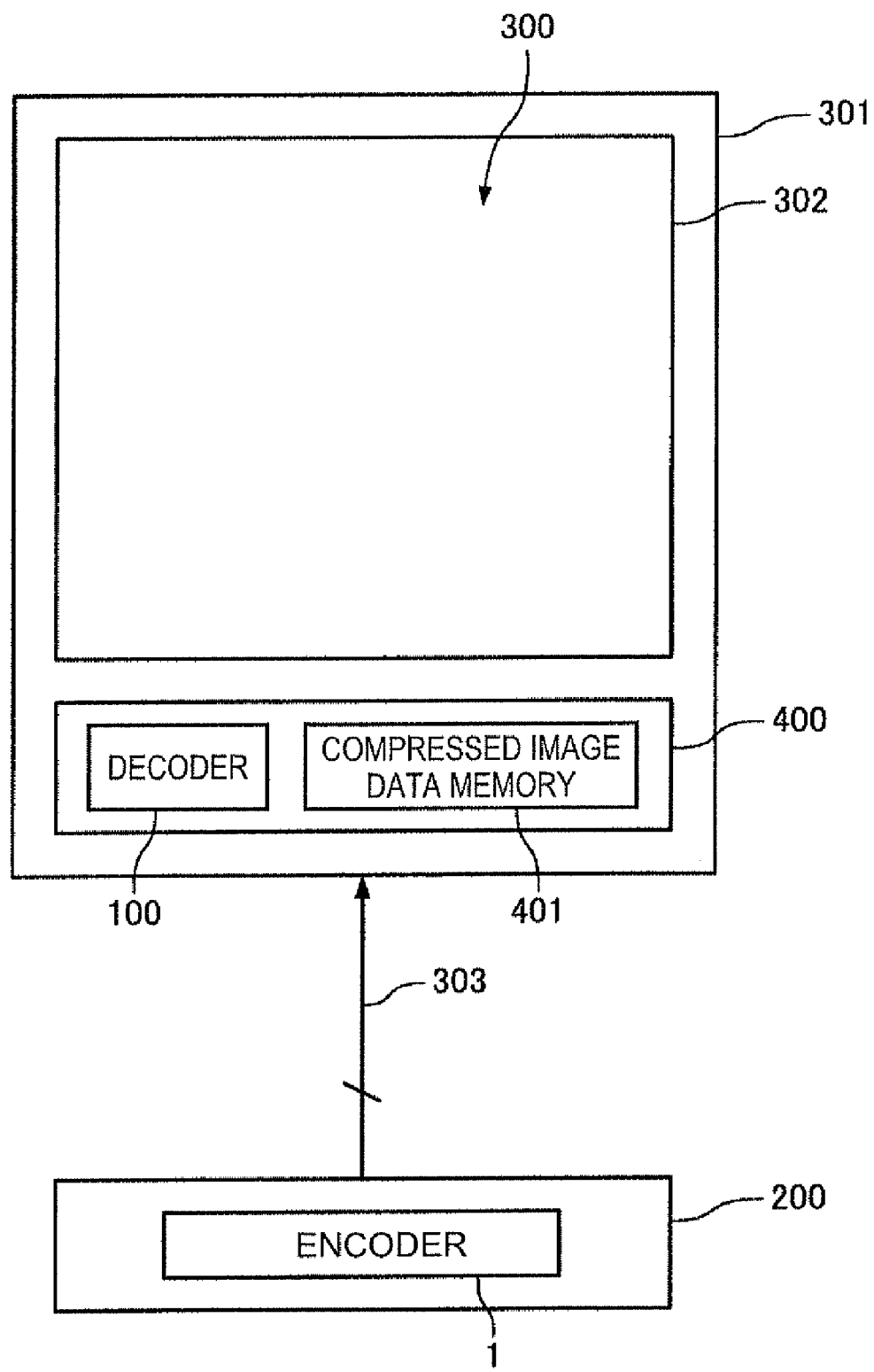
FIG. 14 is a diagram showing another example of an arrangement of the image encoding device and the image decoding device provided to the electronic apparatus shown in FIG. 12.

As FIG. 14 shows, the image encoding device (an encoder) 1 may also be provided to the base band engine 200.

Figure 15:
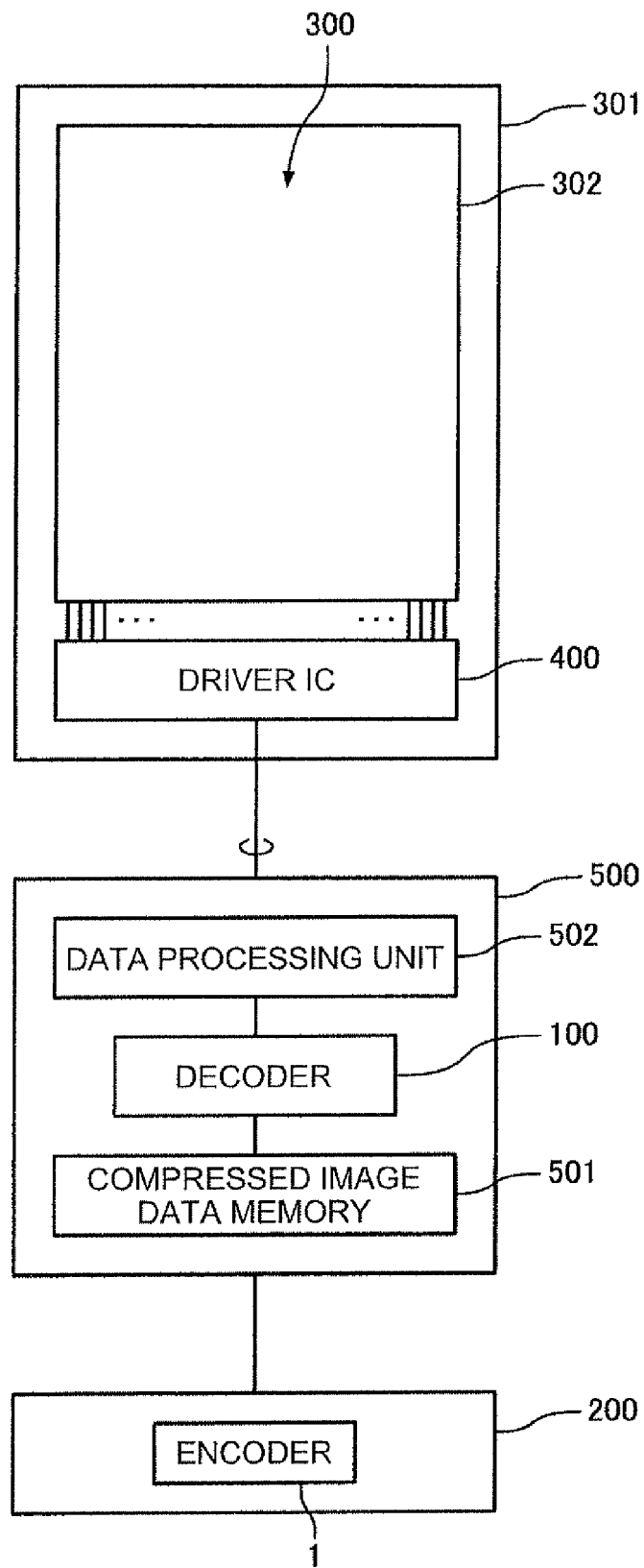
FIG. 15 is a diagram showing another example of the electronic apparatus to which the image encoding device and the image decoding device of the embodiment are provided.

FIG. 15 shows an embodiment in which a display control IC (a third integrated circuit in a broad sense) 500 is added between the base band engine 200 and the liquid crystal panel 300. In FIG. 15, the image encoding device (an encoder) 1 is provided to the base band engine 200. The display control IC 500 is provided for reducing tasks required for display operations of the base band engine 200, and may include a compressed image data memory 501, the decoder 100, and a data processing unit 502.

Figure 16:
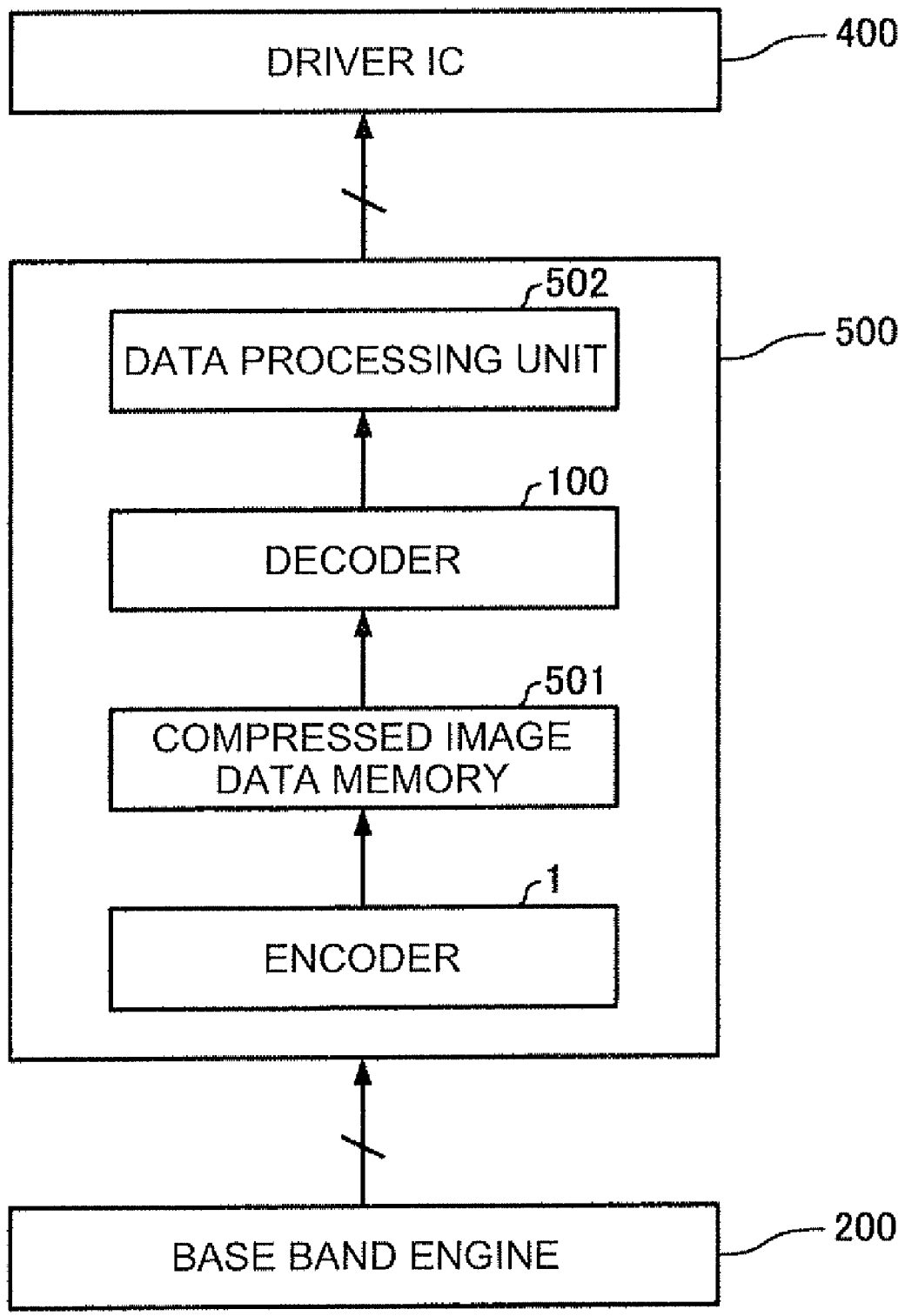
FIG. 16 is a diagram showing another example of an arrangement of the image encoding device and the image decoding device provided to the electronic apparatus which is the same type of electronic apparatus shown in FIG. 15.
Figure 17B:
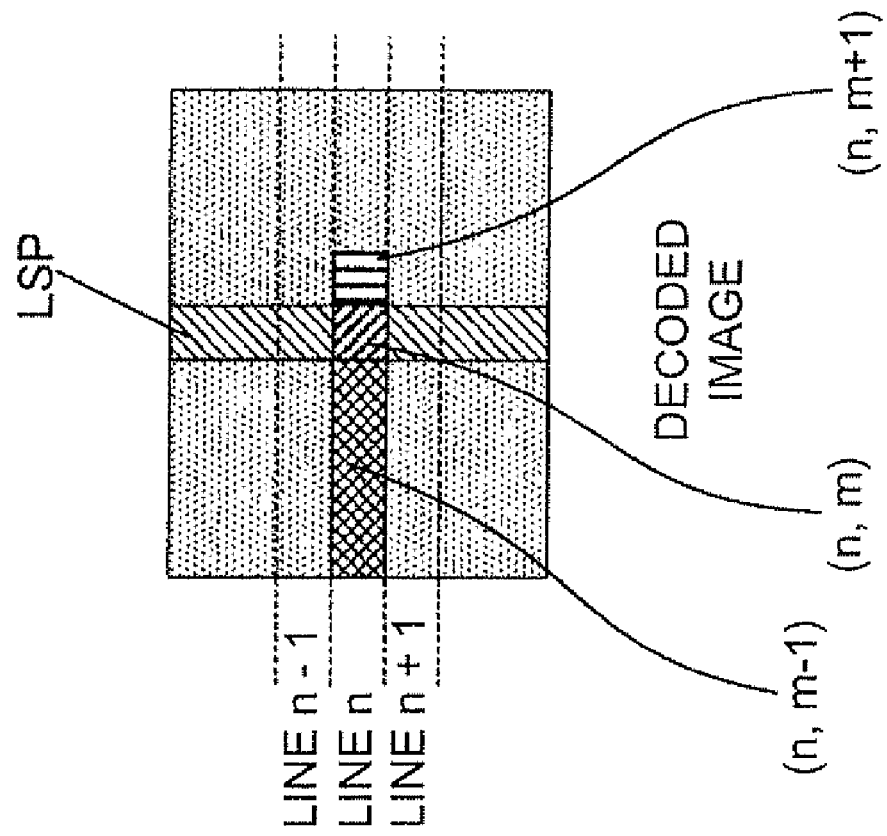
FIGS. 17A and 17B are characteristic diagrams showing an example in which nonlinear quantization is adversely affected of a quantized error of a previous pixel which is locally decoded when a difference between a local decoding pixel value of a previous pixel and an object pixel is nonlinear quantized.
Figure 17A:
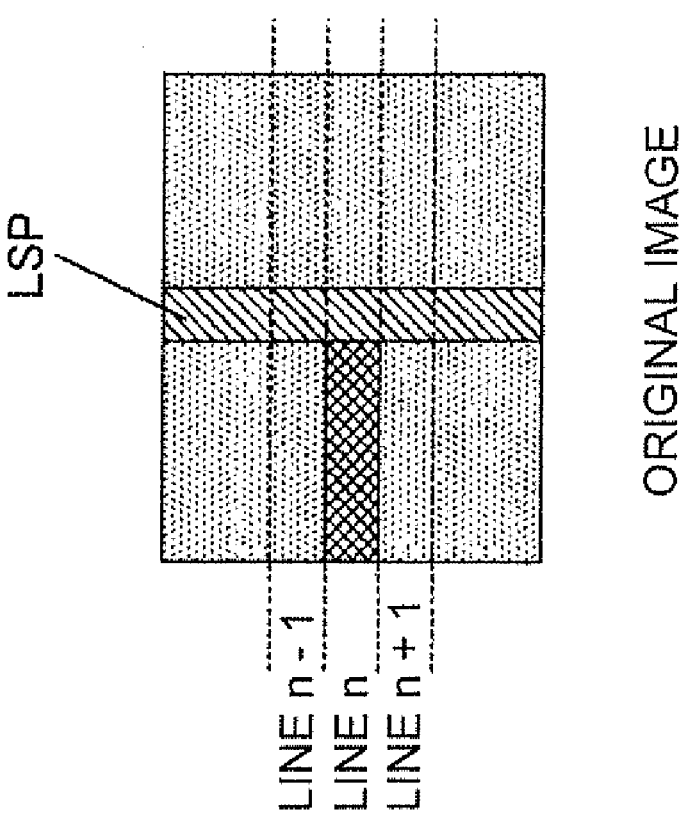

Instead of the embodiment shown in FIG. 15, as FIG. 16 shows, the image encoding device (an encoder) 1 may be provided to the display control IC 500.

While the embodiments have been described in detail above, it will be understood by those skilled in the art that a number of modifications can be made to this embodiment without substantially departing from new matters and advantages of this invention. Therefore, it is to be noted that these modifications are all included in the scope of the invention. For example, terms referred as broader or equivalent terms in the specification and drawings can be replaced with the broader or equivalent terms in any part of the specification and drawings.

What is claimed is:

1. An image encoding device that receives a plurality of component values of a color input signal inputted to an object pixel, vector quantizes, and encodes each of the plurality of component values, comprising:
    a difference vector quantization unit that vector quantizes and encodes each difference value obtained by subtracting prediction component values based on a previous object pixel from the component values of the object pixel respectively;
    an absolute value vector quantization unit that vector quantizes and encodes each different value of the object pixel;
    a determination unit that compares each difference value with respective comparison ranges to determine a code selection; and
    a code selector that selects one of an output from the difference vector quantization unit and an output from the absolute value vector quantization unit based on an output from the determination unit
    wherein a plurality of difference vector quantization representative values assigned to a difference vector quantization space is not arranged to eight corners of a rectangular parallelepiped space that is surrounded by an upper threshold and a lower threshold of each of the comparison ranges in the difference vector quantization space, and the code selector selects an output of the absolute value vector quantization unit based on an output from the determination unit if a difference vector quantization representative value corresponding to each difference value does not exist.

2. The image encoding device according to claim 1, wherein each component value of the color input signal is a luminance component and two kinds of color difference components.

3. The image encoding device according to claim 2, wherein the difference vector quantization unit includes a difference vector quantizer that only vector quantizes each difference value existing within the respective comparison ranges.

4. The image encoding device according to claim 3, wherein the difference vector quantizer equivalently includes the difference vector quantization space that includes respective axes one of which each difference value existing within the respective comparison ranges to be plotted, and the plurality of difference vector quantization representative values is assigned to the difference vector quantization space.

5. The image encoding device according to claim 4, wherein the plurality of the difference vector quantization representative values is closely arranged as each difference value approaches to an origin where each difference value is zero, the plurality of the difference vector quantization representative values is roughly arranged as each difference value moves away from the origin in the difference vector quantization space.

6. An integrated circuit device, comprising:
    the encoding device according to claim 1.

7. The image encoding device according to claim 3, wherein each difference value is represented by bits, and only lower-order bits that included in the bits and within the respective comparison ranges are inputted to the difference vector quantizer.

8. The image encoding device according to claim 2, where the absolute value vector quantization unit equivalently includes a virtual absolute value vector quantization space that includes respective axes one of which each component value to be plotted, and a plurality of absolute value vector quantization representative values is assigned to the absolute value vector quantization space of a sphere.

9. The image encoding device according to claim 8, wherein only higher-order bits of each component value are inputted to the absolute value vector quantization unit.

10. The image encoding device according to claim 9, wherein the absolute value vector quantization unit includes a plurality of pre-scalar quantizers that scalar quantize each component value and an absolute value vector quantizer that outputs one of the plurality of the absolute value vector quantization representative values based on an output from the plurality of the pre-scalar quantizers.

11. An image decoding device that receives an encoding signal that a plurality of component values of a color input signal inputted to a pixel is vector quantized, inverse vector quantizes, and decodes the encoding signal, comprising:
    a determination unit that receives the encoding signal and determines whether the encoding signal is a difference vector quantized code or an absolute value vector quantized code;
    a difference vector inverse quantization unit that receives the encoding signal, and inverse vector quantizes and decodes a difference vector quantized code in a case where the encoding signal received is the difference vector quantized code;

an absolute value vector inverse quantization unit that receives the encoding signal, and inverse vector quantizes and decodes an absolute value vector quantized code in a case where the encoding signal received is the absolute value vector quantized code; and a decoding selector that selects one of an output from the difference vector inverse quantization unit and an output from the absolute value vector inverse quantization unit based on an output from the determination unit wherein he difference vector quantized code received by the image decoding device was produced by a difference vector quantization unit in an image encoding device such that a plurality of difference vector quantization representative values assigned to a difference vector quantization space is not arranged to eight corners of a rectangular parallelepiped space that is surrounded by an upper threshold and a lower threshold of comparison ranges in the difference vector quantization space, and a code selector selects an output of the absolute value vector quantization unit based on an output from the image encoding device's determination unit if a difference vector quantization representative value corresponding to each difference value does not exist.

12. The image decoding device according to claim 11, wherein each component value of the color input signal is a luminance component and two kinds of color difference components.

13. The image decoding device according to claim 12, wherein the encoding signal is one of N number of codes, M (M<N) number of codes out of the N number of codes are difference vector quantized codes, and (N−M) number of codes out of the N number of codes are absolute value vector quantized codes, and wherein the determination unit determines whether a code of the encoding signal belongs to the M or the (N−M).

14. An integrated circuit device, comprising:
the image decoding device according to claim 11.

* * * * *